US012253997B2

(12) United States Patent
Singh et al.

(10) Patent No.: US 12,253,997 B2
(45) Date of Patent: Mar. 18, 2025

(54) DATA OBJECTS IN A DISTRIBUTED FILE SYSTEM

(71) Applicant: Hewlett Packard Enterprise Development LP, Houston, TX (US)

(72) Inventors: Shyam Narayan Singh, Hyderabad Telangana (IN); Anshul Data, Hyderabad Telangana (IN); Rajesh Boddu, Hyderabad Telangana (IN); Prasad Boddupalli, Hyderabad Telangana (IN); Giri Prasad Reddy Desireddygari, Hyderabad Telangana (IN); Premkumar Jonnala, Hyderabad Telangana (IN); Chandra Guru Kiran Babu Sanapala, Hyderabad Telangana (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 139 days.

(21) Appl. No.: 17/655,682

(22) Filed: Mar. 21, 2022

(65) Prior Publication Data

US 2023/0195713 A1 Jun. 22, 2023

(30) Foreign Application Priority Data

Dec. 17, 2021 (IN) .............................. 202141059077

(51) Int. Cl.
*G06F 16/00* (2019.01)
*G06F 16/14* (2019.01)
(Continued)

(52) U.S. Cl.
CPC .......... *G06F 16/2358* (2019.01); *G06F 16/14* (2019.01); *G06F 16/285* (2019.01)

(58) Field of Classification Search
CPC ..... G06F 16/2358; G06F 16/285; G06F 16/14
(Continued)

(56) References Cited

U.S. PATENT DOCUMENTS

| 5,239,647 | A | 8/1993 | Anglin et al. |
| 8,572,055 | B1 | 10/2013 | Wu et al. |

(Continued)

FOREIGN PATENT DOCUMENTS

| CN | 105324765 A | 2/2016 |
| CN | 105718548 A | 6/2016 |

(Continued)

OTHER PUBLICATIONS

Vishal Lall, "Hpe GreenLake edge-to-cloud platform rolls out industry's first cloud-native unified analytics and data lakehouse cloud services optimized for hybrid environments", HPE, Sep. 28, 2021, 15 pages.

(Continued)

*Primary Examiner* — Alexandria Y Bromell
(74) *Attorney, Agent, or Firm* — Trop, Pruner & Hu, P.C.

(57) ABSTRACT

Approaches for writing data objects to a distributed file system are described. In an example, a size of a data object to be created within a distributed file system may be determined based on a client request. Based on the size of the data object, data content of the data object is inserted into one of the object location table, object data table or a data container within the distributed file system. In an example, metadata corresponding to the data object may be written to an object location table.

20 Claims, 11 Drawing Sheets

(51) Int. Cl.
   *G06F 16/23* (2019.01)
   *G06F 16/28* (2019.01)
(58) Field of Classification Search
   USPC ........................................................ 707/609
   See application file for complete search history.

(56) References Cited

U.S. PATENT DOCUMENTS

| | | | |
|---|---|---|---|
| 8,719,286 | B1 | 5/2014 | Xing et al. |
| 8,799,238 | B2 | 8/2014 | Eshghi et al. |
| 8,959,067 | B1 | 2/2015 | Patiejunas et al. |
| 9,183,390 | B2 | 11/2015 | Thadikaran et al. |
| 9,207,930 | B2 | 12/2015 | Srivas et al. |
| 9,222,893 | B2 | 12/2015 | Hornabrook et al. |
| 9,455,955 | B2 | 9/2016 | Fetik |
| 9,501,483 | B2 | 11/2016 | Srivas et al. |
| 9,613,043 | B2 | 4/2017 | Rao et al. |
| 9,633,056 | B2 | 4/2017 | Attarde et al. |
| 9,696,913 | B1 | 7/2017 | Aron et al. |
| 10,146,793 | B2 | 12/2018 | Srivas et al. |
| 10,180,809 | B2 | 1/2019 | Fetik |
| 10,365,974 | B2 | 7/2019 | Todd et al. |
| 10,698,941 | B2 * | 6/2020 | Maybee .............. G06F 16/2365 707/707 |
| 11,017,032 | B1 | 5/2021 | Karppanen |
| 11,182,256 | B2 | 11/2021 | Mayo et al. |
| 11,663,234 | B2 | 5/2023 | Falkinder et al. |
| 11,726,989 | B2 * | 8/2023 | Tesse .................. G06F 16/2237 370/474 |
| 2004/0060073 | A1 | 3/2004 | Bialk et al. |
| 2008/0120544 | A1 | 5/2008 | Treadgold |
| 2010/0053162 | A1 | 3/2010 | Dammertz et al. |
| 2010/0332456 | A1 * | 12/2010 | Prahlad ............... G06F 16/1827 713/160 |
| 2012/0233522 | A1 | 9/2012 | Barton et al. |
| 2013/0185259 | A1 | 7/2013 | Guo |
| 2016/0110260 | A1 | 4/2016 | Chandrasekharan et al. |
| 2017/0270134 | A1 | 9/2017 | Solis |
| 2017/0300633 | A1 | 10/2017 | Simon et al. |
| 2018/0218005 | A1 | 8/2018 | Kuhtz et al. |
| 2018/0307425 | A1 | 10/2018 | Blount |
| 2019/0121705 | A1 | 4/2019 | Mayo et al. |
| 2019/0310968 | A1 | 10/2019 | Attarde et al. |
| 2020/0097445 | A1 | 3/2020 | Grimaldi |
| 2021/0081388 | A1 | 3/2021 | Ding et al. |
| 2021/0397583 | A1 * | 12/2021 | Koppaka ................. G06F 16/14 707/707 |
| 2022/0107921 | A1 | 4/2022 | Mayo et al. |
| 2022/0318223 | A1 * | 10/2022 | Ahluwalia .......... G06F 16/2219 707/707 |

FOREIGN PATENT DOCUMENTS

| | | |
|---|---|---|
| CN | 110603517 A | 12/2019 |
| CN | 112486403 A | 3/2021 |
| WO | 2021/038558 A1 | 3/2021 |

OTHER PUBLICATIONS

Cao, Z. et al.; "TDDFS: A Tier-Aware Data Deduplication-Based File System"; Feb. 2019; 26 pages.

Dagnaw, G. et al.; "dCACH: Content Aware Clustered and Hierarchical Distributed Deduplication"; Nov. 27, 2019; 31 pages.

DeepAI, "What is the Jaccard Index?", available online at <https://deepai.org/machine-learning-glossary-and-terms/jaccard-index#:~:text=The Jaccard Index%2C also known, union of the sample sets>, Apr. 14, 2021, 3 pages.

Lee et al.; "TLSM: Tiered Log-Structured Merge-Tree Utilizing Non-Volatile Memory"; Jun. 9, 2020; 15 pages; IEEE Access; vol. 8; <https://ieeexplore.ieee.org/stamp/stamp.jsp?tp=&arnumber=9056561>.

MinIO, Inc., "High Performance Object Storage," available Nov. 14, 2021, <https://web.archive.org/web/20211114192202/https://min.io/resources/docs/MinIO-high-performance-object-storage.pdf>. 21 pages.

O'Neil, P., et al.; "The Log-Structured Merge-Tree (LSM-Tree)"; 1996; Acta Informatica 33; No. 4; 32 pages.

Vaidya, I. et al.; "An Improved De-Duplication Technique for Small Files in Hadoop"; Jul. 2017; 6 pages.

Wikipedia, "MinHash", available online at <https://en.wikipedia.org/w/index.php?title=MinHash&oldid=1018264865>, Apr. 17, 2021, 7 pages.

Wikipedia, "MinIO," Nov. 21, 2021, <https://en.wikipedia.org/w/index.php?title=MinIO&oldid=1056306026>, 3 pages.

Wikipedia; "B-tree"; Mar, 4, 2021; 12 pages; printed from webpage: <https://en.wikipedia.org/w/index.php?title=B-tree&oldid=1010261854>.

Wikipedia; "Log-structured merge-tree"; Dec. 8, 2020; 3 pages; printed from webpage: <https://en.wikipedia.org/w/index.php?title=Log-structured_merge-tree&oldid=993014830>.

Wikipedia.; "inode"; Dec. 31, 2020; 5 pages; printed from webpage: <https://en.wikipedia.org/w/index.php?title=Inode&oldid=997443541>.

Wikipedia, "Amazon S3", available online at <https://en.wikipedia.org/w/index.php?title=Amazon_S3&oldid=1057018762>, Nov. 24, 2021, 12 pages.

* cited by examiner

DATA OBJECTS IN A DISTRIBUTED FILE SYSTEM

BACKGROUND

In a distributed computing environment, multiple computing devices may be connected with each other to perform coordinated computing tasks in a decentralized manner. Such computing devices, in response to client requests, may perform read or write operations involving data objects. The data objects may be stored in a distributed file system that allows such data objects to be read from, written to, or updated. Operations on the data objects may be effected using different interfaces via file system application programming interfaces (API), via specialized libraries, or via commands communicated to the distributed file system via communication protocols, for example, the HTTP protocol. Within the distributed file system, the data objects may be stored in distributed data structures referred to as data containers. A combination of such data containers forms a data volume through which data may be managed within the distributed file system. The data objects may be of different sizes, ranging between few bytes to multiple gigabytes or even terabytes in size.

BRIEF DESCRIPTION OF FIGURES

Systems and/or methods, in accordance with examples of the present subject matter are now described and with reference to the accompanying figures, in which.

DETAILED DESCRIPTION

Figure 1:
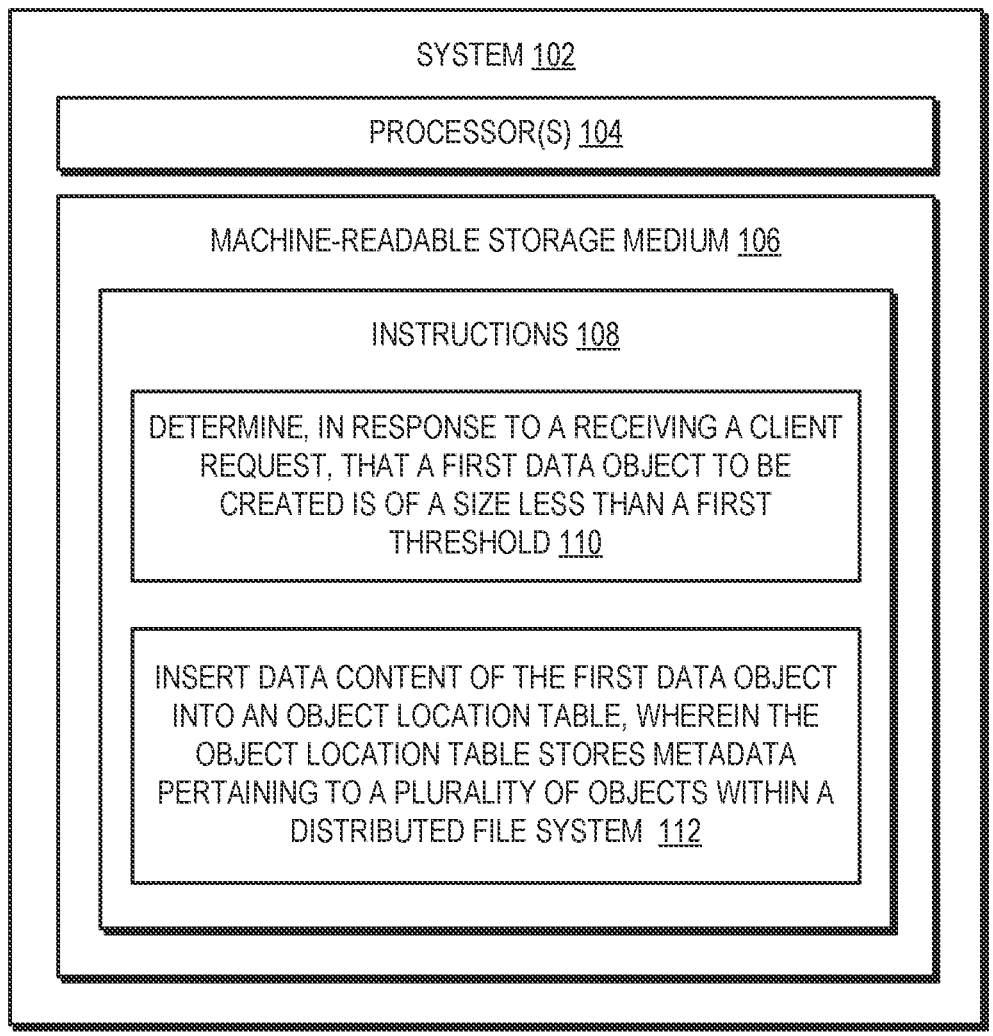
FIG. 1 illustrates a system for creating and writing data objects in a distributed file system, as per an example.

Certain distributed computing systems may implement data writes and updates onto a distributed file system in the form of data objects. Storage of data as data objects differs from storing data as hierarchy of files in folders, or as blocks within storage media. Object storage systems allow the data object to be stored and accessed using web-based protocol, for example HTTP, as a transport mechanism for operations, such as creation, read, and deletion. The data objects comprise data object content and data object metadata. The data object content refers to actual data that is stored in a data object, with the data object metadata providing information about the data object, such as owner, when the data object was created, and other information. In object storage systems, the data object metadata may be used to locate and access a data object.

Distributed file systems may be accessible by a plurality of computing devices within a cluster. An example of such a computing device is a server. Multiple such file system clusters may be logically associated and linked to each other to appear as an otherwise singular file system, although dispersed across multiple clusters with each cluster operating relatively independently. Within the clusters, the data objects may be stored in data containers. The data containers may be replicated and provided on multiple computing devices within the cluster. In instances where one of the computing devices is no longer available, access to data objects may be ensured and enabled through other replicas of that container that may be persisting on such other computing devices within the cluster.

The data object, which includes the data object content (herein after also referred to as data content) and the data object metadata (also referred to herein as metadata), may be of different sizes. For example, data objects may be a few bytes in size (e.g., less than 100 bytes), and may be as large as gigabytes or terabytes. A write operation involving the data content may also include writing metadata, which may be written and maintained within tables. The metadata may be written in multiple steps in parallel with the writing of the data content. The data content and the metadata may be written by an object gateway. An object gateway, as described herein, may refer to a software process that accepts requests from a client computing device to create, access, or delete individual data objects. To this end, the object gateway may translate client requests from client computing devices (referred to herein as client devices) into requests for a file system so that data objects are effectively stored in said file system.

Writing and creating data objects in a distributed file system within the storage medium may result in overhead. Issues pertaining to overhead may become further compounded in cases of tiny data objects. In the context of the present subject matter, a tiny data object may be a data object having size less than a first threshold. For example, data objects having size less than 100 bytes may be considered as tiny data objects. When tiny data objects are written, a majority of actual write operations on storage media occur due to metadata writes in comparison to write operations used for writing data content. For workloads involving a large amount of tiny objects, the effective throughput of distributed computing systems measured in bytes of data written per second may be very low, as a result.

To give an example, certain systems when creating tiny data objects may create a certain number of copies of the data content and may also create about the same number of metadata files. In addition, writing of the data content and the metadata files may also involve performing updates to directories for at least a metadata file and a data content file. Each of such updates may involve multiple disk writes to the storage medium. As a result, the total number of write operations for a single tiny data object may be an order of magnitude larger than implied by the size of the data content. This may limit the effective throughput of the distributed computing system since the updates must complete before an acknowledgment of data object creation is provided to the client device. Storing data objects with a corresponding large number of metadata files may further limit the rate at which data objects may be created and may even limit total number of objects that may be stored within the distributed file system since the metadata is larger than the data objects themselves.

To address the foregoing technical challenges, examples described herein relate to approaches for managing data objects within a distributed file system. Managing data objects may include identifying an object storage strategy for different data objects depending on their size. Depending on the size of the data objects, the data objects may be stored in either database tables or may be stored as data chunks in a data container within the distributed file system. In an example, the different strategies for data objects storage implemented by an object gateway.

To this end, the size of a data object may be initially determined, in response to receiving a client request to create the object. If the size of the data object is determined to be less than a first threshold, the data content corresponding to the data object may be written directly to the object location table. The object location table, in one example, may include multiple fields which store and maintain metadata pertaining to the data objects which may be persisting within the distributed file system and may include an additional field for storing the object data itself. In an example, the data content corresponding to the data object is written, along with the metadata, to such fields within the object location table. The object location table may be stored within a main memory of the computing device of the distributed file system. This is possible as a result of limiting the size of the data objects stored in-line in the object location table. In an example, the data objects which are smaller than 100 bytes in size may be stored directly in the object location table, along with their metadata. Maintaining and storing the object location table within the main memory will thus involve minimal to no disk reads or writes, thereby reducing latency. Storing data content directly in the object location table also does not involve creation of multiple metadata files nor does it result in multiple copies of the data content.

If the size of the data object to be created is determined to be greater than or equal to the first threshold but less than a second threshold, the data content corresponding to such a data object (referred to as the second data object) may be stored in the object data table. In an example, metadata of the second data object may be written to the object location table while the data content corresponding to the second data object may be written to the object data table. The object location table, along with the metadata, may store a reference to the object data table storing the data content. In an example, the object identifier may serve as a key between the object location table (which will hold the metadata of the second data object) and the object data table (where the data corresponding to the second data object may be stored).

Continuing further, data objects of size greater than or equal to the second threshold (referred to as a third data object) may be stored as a single storage unit or a data chunk within data containers in the distributed file system. In such instances, location of the data content of the third data object may be referenced in one of the fields of the object location table. In addition to the location information of the data chunk, metadata of the data corresponding to the third data object may be written to the object location table.

In certain cases, some data objects may be larger in size than the third data object (e.g., by orders of magnitude), with their size being larger than a corresponding third threshold. Data content of such data objects (referred to as a fourth data object) cannot be written as a single chunk but may be written as a plurality of data chunks. In an example, the object location table may include a reference to a table of pointers. Each pointer in the table of pointers may each reference a data chunk which may be stored within the distributed file system.

In an example, the object location table may include an in-progress flag. The in-progress flag may be used to indicate whether the writing of the data corresponding to a given data object has completed or is in progress. For example, if the data has not yet been written or is in the process of being written, the in-progress flag may be set to 'true'. If the in-progress flag is set to 'false' or is not set, the data content corresponding to the data object may be considered as fully written. Data access requests for the data object may be handled based on the status of the in-progress flag. For example, in instances where the creation of the data object is yet to commence, a request for access may fail and may be responded with an error message indicating that the data object does not exist. If the data object creation has commenced, the metadata record of the data object may be created, and the in-progress flag may be set. At this stage, the data content of the data object may be inspected by an object gateway for completeness in response to an access request. If the data content is determined to be complete, the access request may be processed, and the data content may be returned. If, however, the data content is found to be incomplete, the access request may fail, and an error message may be provided. On the other hand, if the in-progress flag is set to 'false' (indicating that the data content has been written completely), the data content may be provided in response to an access request without being checked for completeness. As may be noted, such a methodology enables processing of access requests relative to the completion of creation of the object in a consistent manner, such that the creation of the data object appears to the client devices to be atomic.

The data object creation may be performed in multiple parts, with each part representing a different portion of the data object. In such a case, data object creation may be effected by either by a single object gateway performing write operations in parallel, or by multiple object gateways which may create different portions of the data content. Writing of disjoint portions of the data corresponding to the data object progressively updates the data object. In such a case, the in-progress flag may be used for indicating whether all of the multiple parts constituting the data have been written or not. Once multiple parts are written, the in-progress flag may be accordingly set to 'false'. As will be explained further, the in-progress flag ensures a level of serializable atomicity of the data objects which are created or written. In the context of the present subject matter atomicity may refer to instances where object creation and object access operations yield results that are consistent with each operation occurring at a single and distinct moment in time even though actual operations may take appreciable time. In certain instances, different operations may also overlap in time.

The present approaches enable data objects having size less than the first data object to be stored in line in the object location table, with the larger objects being written and stored either in the object data table, or in data containers. In an example, wherein the object location table is cached within the main memory of the distributed file system, data objects having size less than the first threshold will involve minimal to no disk reads or writes, thereby reducing latency.

This is possible since small fields in a record in the object data table will be kept together in the main memory. In cases where the data object is of a size greater than or equal to the first threshold but less than the second threshold, the current approaches still reduce latency by retaining the object location table (which stores the metadata) within the main memory, with the data content being stored in the object data table. The present approaches may also be implemented for other data objects of different sizes without limiting the scope of the present subject matter. For example, larger data objects may be read and accessed quickly based on the object location table present in the main memory.

FIG. 1 illustrates an example system 102 for creating and writing data objects in a distributed file system. The system 102 may be coupled to a distributed file system. The system 102 may create data objects in response to client requests. The system 102 includes a processor 104, and a machine-readable storage medium 106 which is coupled to, and accessible by, the processor 104. The system 102 may be implemented in any computing system, such as a server, desktop or a laptop computing device, a distributed computing enabled system, or the like. Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. For example, the processor 104 may include a microcontroller, a microprocessor, a central processing unit (CPU), a graphics processing unit (GPU), a data processing unit (DPU), an application-specific integrated circuit (ASIC), a field programmable gate array (FPGA), a system-on-a-chip (SOC), etc. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include non-transitory computer-readable medium including, for example, volatile memory such as RAM (Random Access Memory), or non-volatile memory such as EPROM (Erasable Programmable Read Only Memory), flash memory, and the like. The instructions 108 may be executed to create and manage data objects. In an example, the instructions 108 may be useful for implementing an application programming interface (API) gateway. The API gateway, amongst other operations, may enable the system 102 to function as an intermediary device between a client device and the distributed file system (not shown in FIG. 1). The processor 104 may fetch and execute instructions 108 to perform certain functions.

In an example, as a result of the execution of instructions 110, the system 102 may initially process a client request received from a client device. The client request may relate to creation of a first data object within the distributed file system to which the system 102 may be communicatively coupled. The first data object may include data content and metadata providing information about the data object. The system 102, in response to the client request, may determine whether the first data object which is to be created is of a size which is less than a first threshold. In an example, the first threshold may be 100 bytes. It may be noted that other example values of the first threshold are also possible. In an example, the choice of the value of the first threshold may be based on certain performance characteristics or capacities of the distributed file system.

On determining that the size of the first data object to be created is less than the first threshold, the instructions 112 may be executed to insert data content of the first data object into an object location table. The object location table is a database table which stores metadata corresponding to multiple other data objects within the distributed file system. The object location table may include multiple fields. In an example, the instructions 112 may cause the data content of the first data object to be written to one of the fields of the object location table. In another example, data content may be written to an object data field within the object location table. The example approach as described with respect to FIG. 1 may be used for storing tiny data objects along with the metadata directly within the object location table. As used herein, tiny data objects may be data objects of size less than the first threshold (e.g., 100 bytes). In an example, the object location table may be stored and maintained within the main memory of a computing device of a distributed file system, with which the system 102 may be in communication with.

Figure 2:
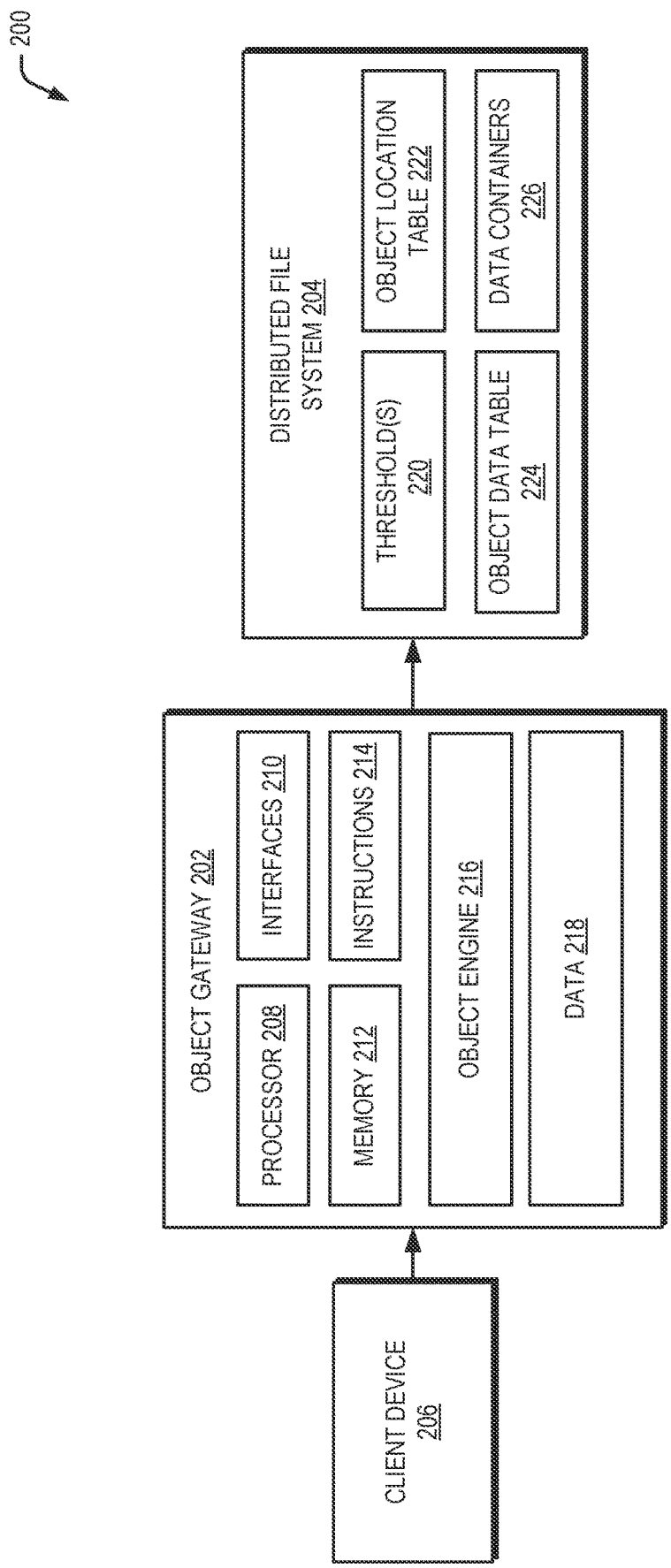
FIG. 2 illustrates a cluster computing environment implementing an object gateway, as per an example.

FIG. 2 illustrates a cluster computing environment 200 (also referred to herein as environment 200) comprising an object gateway 202. The object gateway 202 is used for creating data objects within a distributed file system, based on their size. In some examples, the system 102 described above may serve as the object gateway 202, in part or in whole. In an example, the object gateway 202 (also referred to herein as gateway 202) may be coupled to a distributed file system 204. Although a single gateway 202 is depicted, the environment 200 may include multiple other object gateways (similar to the gateway 202), in other examples.

The distributed file system 204 may store data content of the data objects in the form of various file system objects, such as database tables, in the distributed file system. A data object, as used herein, may refer to a unit of data stored in an object store. The data objects may include data object contents and data object metadata. Distributed file systems, such as the distributed file system 204, allow access to data from multiple hosts through a communications network (e.g., using common networking communication protocols). The gateway 202 and the distributed file system 204, although depicted as different entities, may be logically implemented as separate processes on a shared computing device, or as an integrated process on a shared computing device.

The gateway 202 may function as an intermediary between a client device 206 and the distributed file system 204. The client device 206 may communicate with the gateway 202 through a network within the environment 200. In an example, the gateway 202 may communicate with the client device 206 using certain object protocols and may communicate with the distributed file system 204 through certain file system protocols. The network may be a private network or a public network and may be implemented as a wired network, a wireless network, or a combination of a wired and wireless network. As will be explained, the gateway 202 may receive one or multiple client requests from the client device 206, in response to which data objects may be accessed, modified, or created within the distributed file system 204. The client device 206 may be remote relative to the gateway 202 and the distributed file system 204. In an example, the environment 200 may refer to examples in which different elements of the environment 200 (e.g., the gateway 202 and the distributed file system 204) are locally situated within a data center. The environment 200 may also refer to examples in which such elements are geographically dispersed with one or more of its elements (e.g., the client device 206, the gateway 202 or the distributed file system 204) being remote from other elements. Such different examples would still fall within the scope of the present subject matter.

The gateway 202 may further include a processor 208, interfaces 210, and memory 212. The processor 208 may be implemented as microprocessors, microcomputers, microcontrollers, digital signal processors, CPUs, state machines, logic circuitries, and/or other devices that manipulate signals or requests based on operational instructions. The interfaces 210 may allow the connection or coupling of the gateway 202 with either a single computing device or multiple computing devices, through a wired network, a wireless network, or a combination of a wired and wireless network. The interfaces 210 may also enable intercommunication between different logical as well as hardware components of the gateway 202. The term interfaces 210 here is illustrative and is not to be construed as being limited to a certain type of interfaces. Different types of interfaces 210 may be implemented for enabling communications between the gateway 202 and the client device 206, the gateway 202 and the distributed file system 204, or the gateway 202 and any other computing device, in other examples.

The memory 212 may be a computer-readable medium, examples of which include volatile memory (e.g., RAM, also referred to as the main memory), and/or non-volatile memory (e.g., erasable programmable read-only memory, i.e., EPROM, flash memory, etc.). The memory 212 may be an external memory, or internal memory, such as a flash drive, a compact disk drive, an external hard disk drive, or the like. The memory 212 may further store data which either may be utilized or generated during the operation of the gateway 202.

Similar to the system 102, the gateway 202 may further include instructions 214, an object engine 216, and data 218. In an example, the instructions 214 are fetched from the memory 212 and executed by the processor 208 included within the gateway 202 to cause the object engine 216 to perform multiple functions, as further described. During such functions, the object engine 216 may either utilize or generate data 218 for performing such functions. The object engine 216 may be implemented as a combination of hardware and programming, for example, programmable instructions to implement a variety of functionalities. In further examples described herein, such combinations of hardware and programming may be implemented in several different ways. For example, the programming for the object engine 216 may be executable instructions, such as instructions 214. Such instructions may be stored on a non-transitory machine-readable storage medium which may be coupled either directly with the gateway 202 or indirectly (for example, through networked means). In an example, the object engine 216 may implement an application programming interface (API). In an example, the object engine 216, if implemented as a hardware component, may include a processing resource, for example, either a single processor or a combination of multiple processors, to execute such instructions. In other examples, the object engine 216 may be implemented as electronic circuitry.

The distributed file system 204 (hereinafter referred to as the file system 204) may further include threshold(s) 220. In an example, the threshold(s) 220 may include values defining a first threshold, second threshold, and a third threshold. Other examples may utilize more or fewer thresholds. The first threshold, second threshold, and a third threshold may be retrieved and utilized by the object engine 216 for classifying the data object as a first data object (e.g., a tiny object), a second data object (e.g., a small data object), a third data object (e.g., a medium-sized data object), or a fourth data object (e.g., large data object), depending on their size.

In an example, a data object may be considered to be a tiny data object if the size of the data object under consideration is less than the first threshold. In a similar manner, any data object may be understood to be a small data object if its size is greater than or equal to the first threshold and is less than the second threshold. If the size of the data object to be created is greater than or equal to the second threshold and is less than the third threshold, the said object may be considered to be a medium-sized data object. Large data objects may be considered as those data objects having size equal to or greater than the third threshold. In an example, the first threshold may be 100 bytes, with the second threshold and the third threshold being 16 kilobytes (kB) and 256 megabytes (MB), respectively. It may be noted that the values of any one of first threshold, the second threshold, and the third threshold may differ, in an example. The first threshold, the second threshold, and the third threshold are an example implementation, and there may also be more or fewer threshold values, in other implementations. In an example, the choice of the values of the first threshold, the second threshold, and the third threshold may be based on specific performance characteristics or capacities of the type of distributed file system 204. In operation, the gateway 202 may fetch and obtain any one of the threshold values as described above from the distributed file system 204 and may store the threshold values in memory 212. The threshold values may be useful for determining whether a given data object to be created is a first data object (e.g., a tiny data object), second data object (e.g., a small data object), third data object (e.g., medium-sized data object), or fourth data object (large data object).

Proceeding further, the file system 204 may further include an object location table 222 and an object data table 224. The object location table 222 maintained by the distributed file system 204 may, amongst other things, store metadata corresponding to the data objects being maintained and managed within the distributed file system 204. The object data table 224 may be used for storing data pertaining to data objects, as will be explained further. As will be explained further, the object location table 222 and object data table 224 provide row-atomic updates thereby enabling the small data object to appear to be created atomically to any client device attempting to access the data content through any object engine (such as the object engine 216).

The distributed file system 204, may further include data containers 226. In operation, data content and the metadata of the data objects are rearranged (as will be described below) and written in the file system 204 as file system data, using components of the file system 204 such as the object location table 222, the object data table 224, and file storage. Data content once written to the file system 204 may be referred to as file system data. The gateway 202 may initially receive a client request from the client device 206 (e.g., via an API implemented by the gateway 202). The client device 206 may follow an object protocol for communicating the client request to the gateway 202. The client request may be a request to create a data object within the distributed file system 204. As described previously, data objects, which besides including data content, also include metadata. In an example, the metadata may include identification information or identifiers which may aid in uniquely identifying any given data object.

The object engine 216 may determine the size of the data object that is to be created in response to the client request received from the client device 206. Based on comparing the size of the data object to the values of one or more thresholds (e.g., the first threshold, the second threshold, and/or the third threshold), the object engine 216 may determine how to categorize the data object. For example, the data object under consideration may be deemed a tiny data object, small data object, medium-sized object, or a large data object. Accordingly, the object engine 216 may determine the manner in which the data objects may be stored in the distributed file system 204.

In an example, the object engine 216 may determine that the data object under consideration is a tiny data object. Data objects, in an example, may be considered to be tiny data objects if their size is less than 100 bytes. It may be noted that the particular value of present threshold is an example. Other example limits defining as to what may be a tiny data object may also be used. On determining that the data object under consideration is a tiny data object, the object engine 216 may send a request to the distributed file system 204 to store the data content of the tiny data object together with the metadata for the data object in the same record in the object location table 222. In an example, the object engine 216 may write the data content and the metadata of the tiny data object to a row of the object location table 222, as a single row update. This aspect is further explained in conjunction with FIG. 3, which depicts an example schema 300 of the object location table 222.

Figure 3:
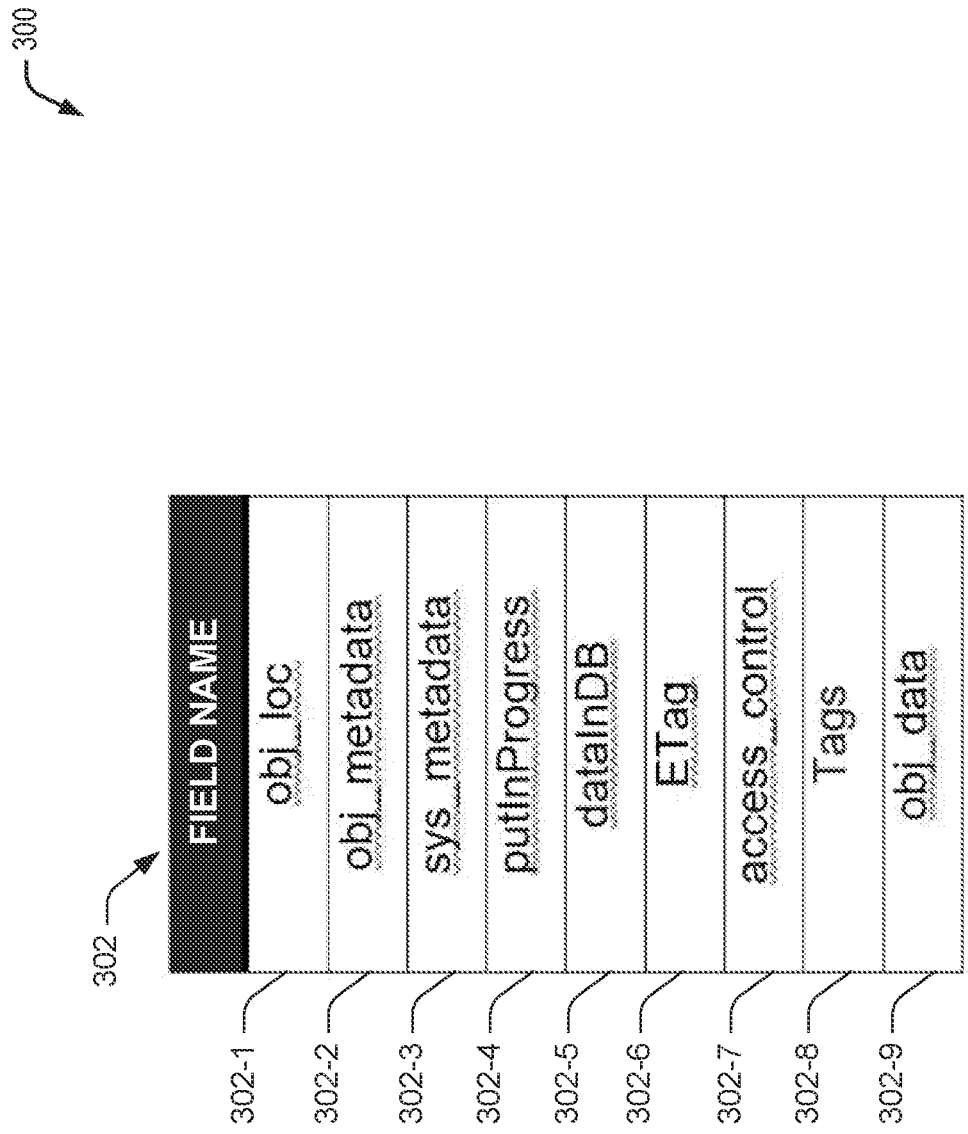
FIG. 3 illustrates an example schema of an object location table, as per an example.

As depicted in FIG. 3, the schema 300 illustrates a plurality of example fields 302 of the object location table 222. The schema 300 may define the organizational structure of the object location table 222, wherein the fields 302 of the schema 300 may be the columns of the object location table 222. The fields 302 may include an obj_loc field 302-1, obj_metadata field 302-2, sys metadata field 302-3, putInProgress field 302-4, dataInDB field 302-5, ETag field 302-6, access control field 302-7, Tags field 302-8, and obj_data field 302-9. It may be noted that the schema 300 is an example, and the schema 300 may include other fields or may not include all the fields 302 shown in FIG. 3. Such alternative forms of schemata would be examples of the present subject matter.

Continuing with the example schema 300, the obj_loc field 302-1, or the object location field, may be used for indicating a memory location of a data object, in instances where the data content of the data objects are not written to either the object location table 222 or the object data table 224. In the event that the data object being created is a tiny data object, the obj_loc field 302-1 may be null or left blank. The obj_metadata field 302-2 and sys metadata field 302-3 in turn may specify user specific metadata and system specific metadata, respectively, corresponding to the data objects. The putInProgress field 302-4 may indicate whether the writing of the data object is in progress. For example, the putInProgress field 302-4 may be set to value 'true' to indicate that the writing of the data object is underway and not yet completed. Once completed, the value of the putInProgress field 302-4 may be set to 'false' to mark that the data object has been completely written.

Other fields 302 may provide further information pertaining to the data objects. The dataInDB field 302-5 may indicate whether data content of data objects have been written to either the object location table 222 or the object data table 224. In case where the data content and the metadata are inserted as a single row entry into the object location table 222, the dataInDB field 302-5 may be set to '1'. In case of other data objects which are not stored in either the object location table 222 or the object data table 224, but the distributed file system 204, the dataInDB field 302-5 may be set to '0'. In an example, the dataInDB field 302-5 may be absent from the object location table 222 to indicate that the data objects have been written to the distributed file system 204. The ETag field 302-6, access control field 302-7, and the Tags field 302-8 indicate other information pertaining to the data objects under consideration. For example, the Etag field 302-6 may store and provide a checksum value of the data corresponding to the data objects. The access control field 302-7 and the Tags field 302-8 may be used to provide information pertaining to various other applicable policies and user tags, respectively.

Continuing with the above, when the data object under consideration is a tiny data object, the object location table 222 corresponding to the schema 300 may be such that the dataInDB field 302-5 may be set to '1', with the data content of tiny data object inserted into the obj_data field 302-9. The values of the other fields 302 may depend on the data content and the metadata of the tiny data object. In an example, the object location table 222 may be stored in-memory, i.e., may be available within the main memory of a computing device of the distributed file system 204. Since the object location table 222 is in-memory, any access to the tiny data object may be performed without any disk reads. In an example, the object location table 222 may be partially stored in-memory, particularly with the rows corresponding to the most used objects being retained in-memory.

Figure 4:
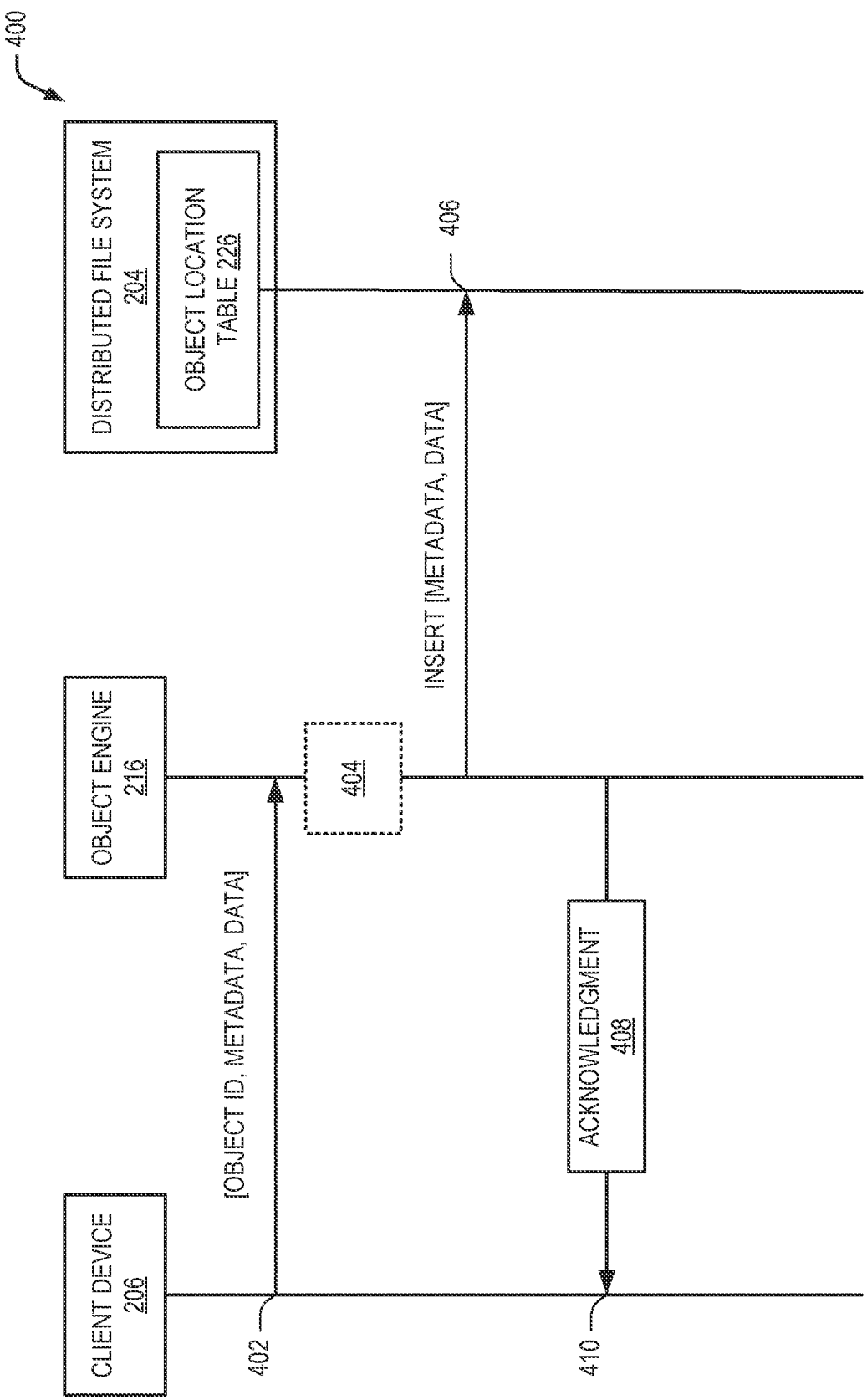
FIG. 4 illustrates a flow diagram depicting the manner in which a tiny data object is created or written in a distributed file system, as per an example.

The creation of the tiny data object and insertion of the data content into the object location table 222, i.e., into the obj_data field 302-9 of the object location table 222 with the metadata being inserted into one or more of the other fields 302, is further explained in conjunction with a flow diagram 400 as depicted in FIG. 4. FIG. 4 depicts a series of steps undertaken by the client device 206 and the gateway 202 when handling a tiny data object. In an example, the client device 206 may send a client request to create an object to the gateway 202. In an example, the client request may include an object identifier of the tiny data object, as well as the metadata and the corresponding data content. This is depicted by step 402.

The object engine 216 within the gateway 202 may process the received client request and determine that the data object is a tiny data object (e.g., size less than a first threshold), at step 404. The object engine 216 may then generate and transmit an insert command to the distributed file system 204, at step 406. The insert command generated by the object engine 216 is processed by the distributed file system 204 to insert the data content of the tiny data object into one of the rows of the object location table 222. In an example, the data content of tiny data object is inserted into the obj_data field (such as the obj_data field 302-9) of the object location table 222. In an example, the metadata of the tiny data object may be written to the obj_metadata field 302-2 of the object location table 222.

Once the data content of the tiny data object is inserted into the obj_data field, and the metadata is inserted into the obj_metadata field of the object location table 222, the object engine 216 may generate an acknowledgment 408 of the insertion of the tiny data object into the object location table 222, to the client device 206, as depicted by step 410. Once inserted, any request to access the data object, received from any client device, will result in an object gateway determining that the tiny data object is present, and accordingly return the data content of the tiny data object. Because the object location table 222 provides atomic updates of rows, the creation of the object appears to be atomic to any client devices interacting with any object engine, besides the client device 206 and the gateway 202, that may be present within the environment 200.

In another example, the object engine 216 may determine that the data object to be created according to a client request is a small data object, i.e., having a size greater than or equal to the first threshold and less than the second threshold. In an example, the second threshold may be 16 kB. The object engine 216 may insert the data content of the small data object into the object data table 224. With the data content of the small data object inserted into the object data table 224, the object engine 216 may insert the metadata of the small data object into the object location table 222, for example, in the obj_metadata field of the object location table 222. In another example, the object location table 222 may store a reference to the object data table 224 where the data content of the small data object is stored.

The object engine 216 may set the dataInDB field, such as the dataInDB field 302-5, to '1' indicating that the data content of the small data object is present in the object data table 224 (or the object location table 222 in case of the tiny data object). In an example, entries of the object location table 222 and the data content in the object data table 224 may be linked based on an object identifier of the small data object. In this manner, the metadata is written to the object location table 222, with the data content of small data object being written to the object data table 224.

Figure 5:
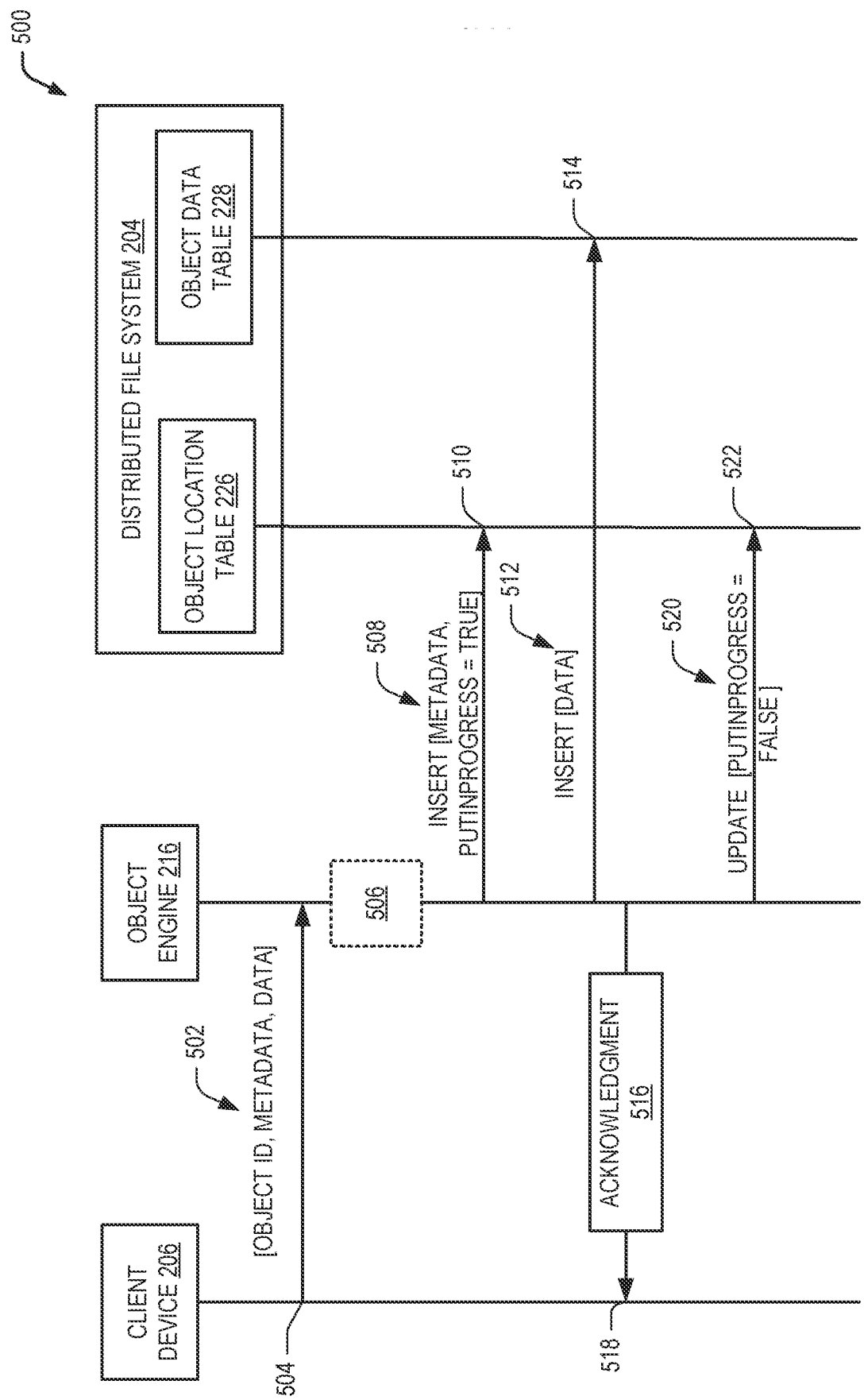
FIG. 5 illustrates a flow diagram depicting the manner in which a small data object is created or written in a distributed file system, as per an example.

The creation of the small data object and insertion of its data content into the object data table 224, is further explained in conjunction with a flow diagram 500 as depicted in FIG. 5. FIG. 5 depicts a series of steps undertaken by the client device 206 and the gateway 202 when handling a small data object. As will be shown, creating the small data object involves writing the metadata into the object location table 222 and the data content into the object data table 224. In an example, at step 504, the client device 206 may send a client request 502 to the gateway 202 for creating the small data object. Similar to the step 402 (as discussed in conjunction with FIG. 4) the client request 502 may include an object identifier of the small data object as well as the metadata and the corresponding content data.

At block 506, the object engine 216 processes the client request 502, including determining that the data object is a small data object (e.g., size greater than or equal to the first threshold and less than a second threshold). The object engine 216 may, on determining that the data object to be created is a small data object, generate and transmit a first insert command 508, which when processed by the distributed file system 204 inserts or writes the metadata to the object location table 222 (as depicted by step 510). In an example, the object engine 216 may further cause a putInProgress flag in the putInProgress field 302-4 to be set to 'true' to indicate that the transfer of the small data object has commenced and is in progress. In another example, the object engine 216 may also cause the dataInDB field, such as the dataInDB field 302-5, to be set to '1' to indicate that the small data object is present in one of the database tables, namely, the object data table 224 in the present case.

Concurrently with the step 510, the object engine 216 may further generate and transmit a second insert command 512. The second insert command 512 is received and processed by the distributed file system 204 to insert the data content of the small data object into the object data table 224 (depicted as step 514). Once the data content of the small data object has been inserted into the object data table 224 and the metadata has been inserted into the object location table 222, the object engine 216 within the gateway 202 may transmit an acknowledgment 516 that the small data object has been inserted into the object data table 224 (depicted as step 518), to the client device 206. In an example, once the acknowledgment 516 has been communicated to the client device 206, the object engine 216 within the gateway 202 may accordingly update (through an update command 520) the status of the putInProgress flag (e.g., as indicated by the putInProgress field 302-4) to 'false' to indicate that the insertion of the small data object into the object data table 224 has completed (depicted as step 522).

In an example, the putInProgress flag may be used for handling data access requests from any client device. For example, in instances where the creation of the data object (e.g., the small data object) is yet to commence, a request for access received by the object engine 216 may fail. In such a case, the object engine 216 may respond with an error message indicating that the small data object does not exist.

If the creation of the small data object has commenced and the metadata record has been created, the putInProgress flag may be set to 'true' by the object engine 216. At this stage, the object engine 216 may inspect the data content of the small data object for completeness in response to an access request. If the data content is determined to be complete, the object engine 216 may process the access request and accordingly return the data content. If, however, the data content is found to be incomplete, the access request may fail. In such a case, the object engine 216 may provide an error message. As may be noted, any access request received by the object engine 216 may involve checking the small data object for completeness. On the other hand, if the putInProgress flag is set to 'false', the data content of the small data object may be returned by the object engine 216 in response to an access request. In such a case, the object engine 216 may return the data content without checking the same for completeness.

Because the object location table 222 and object data table 224 provide row-atomic updates, the small data object may appear to be created atomically to any client device attempting to access the data content through any object engine (such as the object engine 216). In such a case, the object engine 216 may examine the content of the object location table 222 and the object data table 224 to determine if valid content is available, as described above. Although the role of the putInProgress flag in handling access requests is described with respect to the small data object, similar approaches may be implemented for other data objects, such as the medium-sized data objects and the large data objects as well.

The putInProgress flag may be utilized to determine any data object creation failures. In an example, the object engine 216 may scan the object location table 222 to identify all row entries in which the putInProgress flag has been indicated as 'true'. As described earlier, putInProgress flag being set to 'true' indicates that the insertion of a data object (i.e., a small data object) had commenced, but not yet completed. The object engine 216 may thereafter scan the object data table 224 to ascertain whether the corresponding data entries are present, based on the object identifier. Records which are, for example, older than an arbitrary threshold such as one hour, and that also have putInProgress flag set to 'true' but no corresponding data in the object data table 224, may be concluded as failed insertion attempts. On detecting such entries, the object engine 216 may remove such entries from the object location table 222, thus maintaining a lean and efficiently-sized object location table 222.

With respect to data objects which are greater than or equal to in size than the second threshold but less than a third threshold, and also data objects which are greater than or equal in size than the third threshold, the data content is directly written to the distributed file system 204 instead of the object location table 222 or the object data table 224. In an example, the object engine 216 may determine that a medium-sized data object (i.e., having a size which is greater than or equal to the second threshold and less than the third threshold) is to be created, based on a client request received from the client device 206. In response to receiving the client request, the object engine 216 may initiate insertion of the data content of the medium-sized data objects into data containers 226 within the distributed file system 204 as a data chunk. Concurrently, the object engine 216 may insert metadata of the medium-sized data object into the object location table 222. In an example, the object engine 216 may set the putInProgress flag to 'true' to indicate that the insertion of the medium-sized data object has initiated and is in progress. Once the data content of the medium-sized data object has been inserted, the object engine 216 within the gateway 202 may respond with an acknowledgment to the client device 206. Thereafter, the object engine 216 may update the putInProgress flag to 'false' to indicate that the insertion of the medium-sized data object has completed.

The data content of medium-sized data object is written to the data containers 226 within the distributed file system 204 in the form of data chunk, with the metadata being written to the object location table 222. In an example, a data chunk or a chunk may refer to segments or portions of files within the distributed file system. The files within the distributed file system may be split into segments or portions (i.e., chunks) having a predefined size. For example, in some implementations, files which are large enough (e.g., in gigabytes) within a distributed file system may be split into chunks that are 256 MB in size, although other sizes may be used in other implementations. In some implementations, the third threshold may be the same as the chunk size such that medium-sized data objects are stored in a single chunk, which may avoid the creation of additional metadata (i.e., a table of pointers) associated with splitting data content among multiple chunks.

Figure 6:
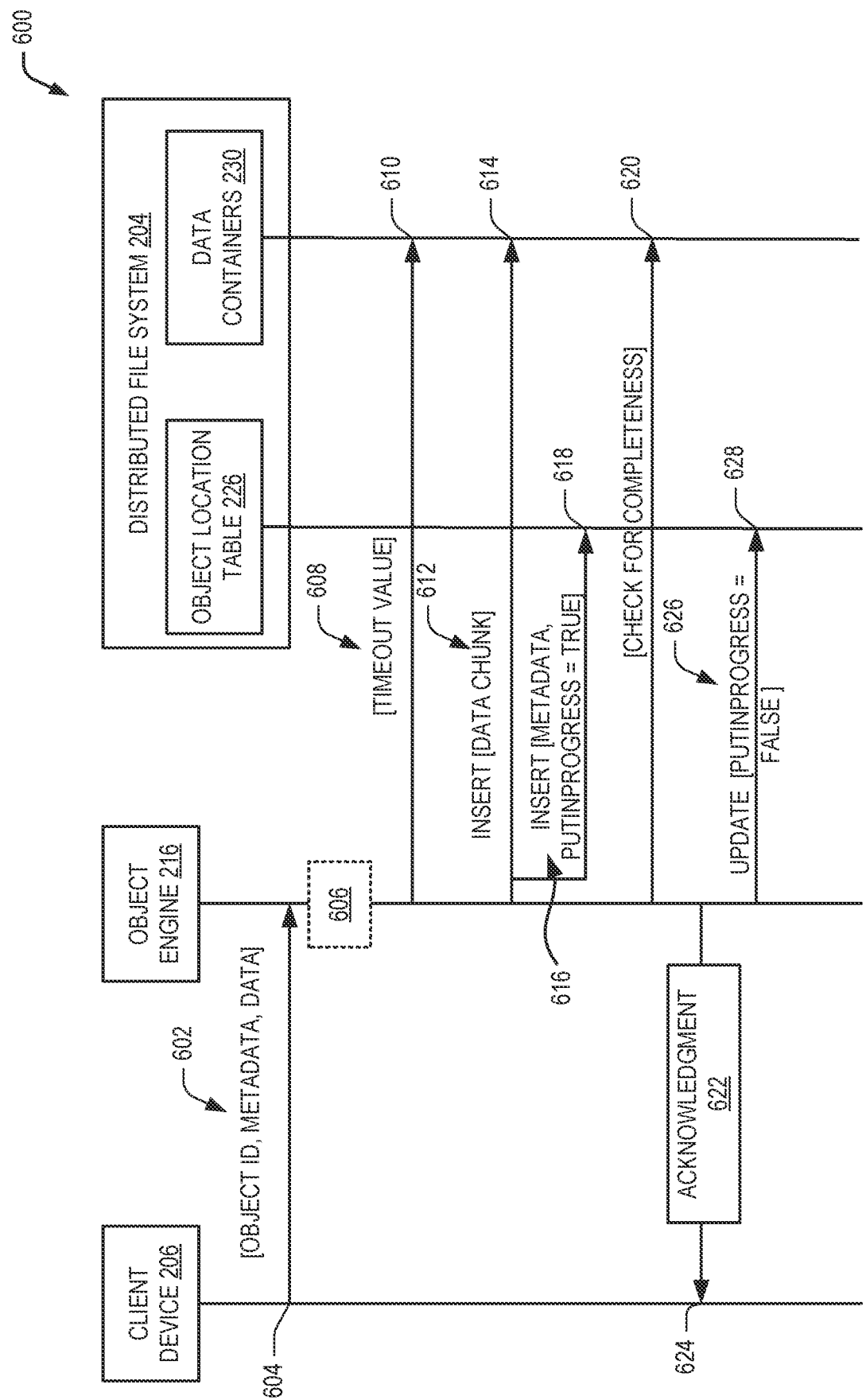
FIG. 6 illustrates a flow diagram depicting the manner in which a medium-sized data object is created or written in a distributed file system, as per an example.

The manner in which the medium-sized data object may be written to data containers 226 within the distributed file system 204 is further described with respect to the flow diagram 600 in FIG. 6. In FIG. 6, the gateway 202 may receive a client request 602 from the client device 206 (as depicted by step 604). In an example, the client request 602 may include an identifier for the medium-sized data object, the data content, and the metadata. At block 606, the object engine 216 may process the client request 602, including determining that the data object to be created is a medium-sized data object (i.e., greater than or equal to the second threshold but less than the third threshold).

In an example, the object engine 216 may create a reference or a pointer to the data. The reference may be created as a valid reference to data content that is yet to written in the distributed file system 204. In an example, the reference to such prospective data content may be maintained within a data structure referred to as an orphanage structure. Continuing further, the object engine 216 may notify a timeout value 608 to the data containers 226 within the distributed file system 204 (as depicted in step 610). If the medium-sized data object is written to the distributed file system 204 within the timeout value, the reference or pointer within the orphanage structure may be flushed to the storage medium of the distributed file system 204. If, however, the creation of the medium-sized data object fails, and the timeout expires, the reference within the orphanage structure may be removed at a later stage, as described further.

The creation of the medium-sized data object may proceed further with the object engine 216 generating and transmitting a first insert command 612, which when processed by the distributed file system 204 inserts the data content of the medium-sized data object as a chunk into the distributed file system 204 (as depicted in step 614). Concurrently, the object engine 216 may generate and transmit a second insert command 616 which is received and processed by the distributed file system 204 to insert or modify metadata into the object location table 222 (as depicted in step 618). In an example, the object engine 216 may set the putInProgress flag (e.g., the putInProgress field 302-4) within the object location table 222 to 'true' while the medium-sized data object is being written to the data containers 226. The object engine 216 may also set dataInDB field (e.g., the dataInDB field 302-5) to 'false' since the medium-sized data object is being written to the data containers 226 as opposed to the object location table 222 or the object data table 224 (as was the case for tiny data objects and small data objects, respectively).

The object location table 222 may also include references to location of the written data content of the medium-sized data object within the distributed file system 204. In an example, the location of the medium-sized data object may be written to the obj_loc field (e.g., the obj_loc field 302-1) of the object location table 222. The location may be specified as a pointer referencing the medium-sized data object within the storage medium associated with the distributed file system 204.

Once the medium-sized data object has been written to the distributed file system 204, the object engine 216 may check the data content for completeness (as depicted in step 620). The object engine 216 may check the reference within the orphanage structure to ascertain whether the data content written to the distributed file system 204 is valid or not, based on a checksum of the data content of the medium-sized data object. In an example, the checksum may be recorded in the ETag field (e.g., the ETag field 302-6) of the object location table 222. The object engine 216, based on the checksum available within the ETag field of the object location table 222, may ascertain whether the data content written thus far is complete or not.

In certain cases, it may be possible that the client device 206 (or any other client device) may seek to access the medium-sized data object, the data content of which is either partially written at the time of request or has been completely written but the putInProgress flag is not yet set to 'false'. In such a case, the object engine 216 may return the data content in response to the client request. In an example, if the data content was determined to be complete, the same may be returned in response to the requesting client (e.g., the client device 206). If the content is determined to be not complete, the object engine 216 may return earlier versions of the medium-sized data object (and its corresponding data), if the same are available. In this manner, any request from the client device 206 (or any other client device) will encounter a consistent view of the data object. Once verified, the object engine 216 may communicate an acknowledgment 622 that the medium-sized data object has been created to the client device 206 (as depicted in step 624).

It may be noted that with respect to medium-sized data object, entries in the object location table 222 are written concurrently with the writing of the data content as chunks to the distributed file system 204. As may be appreciated, concurrent entries into the object location table 222 and distributed file system 204 enable the data corresponding to the medium-sized data object to be created in an atomic manner. To this end, initially, references to the data content to be written and metadata are created as entries in the object location table 222. Concurrently, the medium-sized data object is written in the form of a chunk into the distributed file system 204.

Once the medium-sized data object has been completely written to the data containers 226 in the distributed file system 204, the object engine 216 may, using an update command 626, set the putInProgress flag to 'false' indicating that the medium-sized data object has been completely written to the data containers 226, as depicted in step 628.

The data objects having size greater than or equal to the third threshold may be considered as large data objects. Similar to the medium-sized data objects, the data content of the large data objects may be written to the distributed file system 204 with the metadata being written to the object location table 222. In an example, owing to their size, the large data objects may be written as a plurality of chunks.

Figure 7:
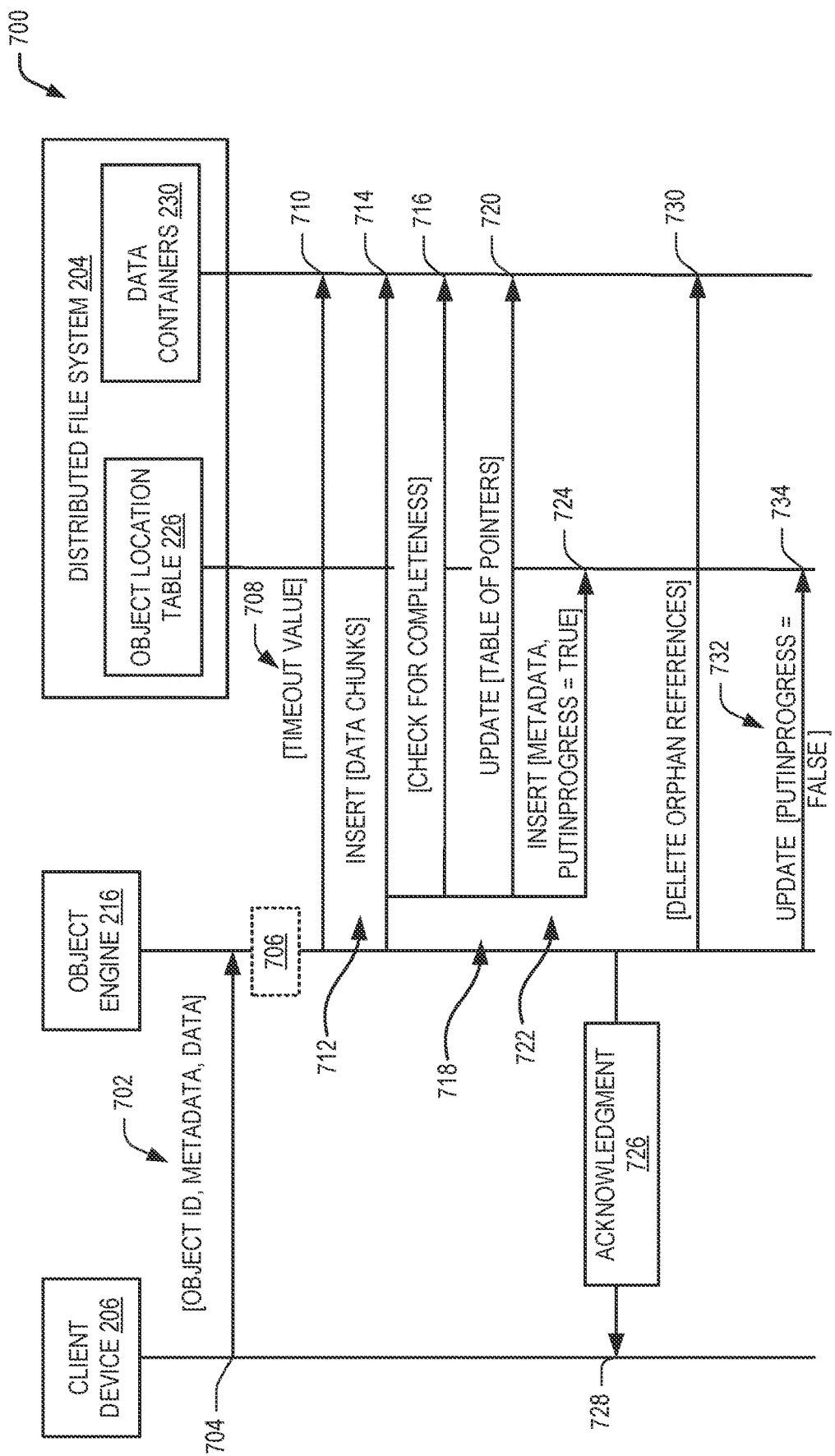
FIG. 7 illustrates a flow diagram depicting the manner in which a large data object is created or written in a distributed file system, as per an example.

The manner in which the large data object may be written to the distributed file system 204 is further described with respect to the flow diagram 700 in FIG. 7. As depicted in FIG. 7, the gateway 202 may receive a client request 702 from the client device 206 (depicted as step 704). In an example, the client request 702 may include an identifier for the large data object, the data content (i.e., the file content) and the metadata of the large data object. Similar to the other data objects of different sizes as discussed previously, the object engine 216 may process the client request 702 to determine that the data object to be created is a large data object (as depicted by block 706).

The object engine 216 may create an orphanage structure which may include a reference to a table of pointers or valid references to the chunks of data content that may not yet have been written. Such data content (which is yet to be written) may be located within data containers 226 within which the reference may be present, or in other data containers 226. As will be explained further, the reference structure may be updated once the plurality of chunks have been written to the data containers 226 within the distributed file system 204.

Continuing with the present example, the object engine 216 may notify a timeout value 708 to the distributed file system 204 (as depicted in step 710) for the large data object within which the references in the reference structure may be linked or associated with the data chunks. If the large data object is written to the data containers 226 within the timeout value, the references or pointers within the reference structure may be retained. If, however, the creation of the large data object fails, and the timeout expires, the references within the orphanage structure may be removed by the distributed file system 204, as discussed later.

The object engine 216 may thereafter insert the data content of the large data object as plurality of chunks into the data containers 226 of the distributed file system 204, using a first insert command 712 generated and transmitted by the object engine 216 to the distributed file system 204 for processing (as depicted in step 714). Once the plurality of chunks are written to the data containers 226, the object engine 216 may accordingly check the data chunks for completeness (as depicted in step 716). In an example, the completeness of the chunk written to the data containers 226 may be checked based on the checksum of the data content of the data chunks written to distributed file system 204, in a similar manner as described with respect to medium-sized data object. The checksum may be recorded in the ETag field (e.g., the ETag field 302-6) of the object location table 222.

Considering that the large data object is written in the form of a plurality of chunks, the object location table 222 may update the table of pointers, with the pointers pointing to the multiple chunks of the large data object. While the data chunks are written to the data containers 226 of the distributed file system 204 (as described in step 716), the object engine 216 may concurrently update the table of pointers using an update command 718 (as depicted in step 720). In an example, the object engine 216 may update the table of pointers for the completed chunks of the large data object, which have been written to the data containers 226.

Concurrent to the insertion of the chunks of the large data object and the updating of the table of pointers, the object engine 216 may further generate and transmit a second insert command 722 (as depicted in step 724), which may be processed by the distributed file system 204 to insert and modify the metadata into the object location table 222. In an example, the object engine 216 may set the putInProgress flag (e.g., the putInProgress field 302-4) within the object location table 222 to 'true' while the large data object is being written to the data containers 226. In addition, the object engine 216 may also set dataInDB field (e.g., the dataInDB field 302-5) to 'false' since the large data object is being written to the data containers 226 as opposed to the object location table 222 or the object data table 224 (as was the case for tiny data objects and small data objects). In an example, the reference to the table of pointers may be written to the object location table 222. In an example, the pointer to the reference structure may be written to the obj_loc field (e.g., the obj_loc field 302-1) of the object location table 222.

Once the data content of the large data object has been written, the object engine 216 may communicate an acknowledgment 726 that the large data object has been created to the client device 206 (as depicted in step 728). The object engine 216 may then check for any unreferenced or dangling references in the orphanage structure that may be present owing to any failure in writing of certain data chunks of the large data object to the data containers 226. Such references may be cleared or deleted from the distributed file system 204 at step 730, by the object engine 216.

Thereafter, the object engine 216 may update the putInProgress flag using an update command 732 and set it to 'false' to indicate that the writing of the large data object to the data containers 226 has completed (as depicted in step 734). In certain cases, it is possible that the client device 206 (or any other client device) may seek to access the large data object which is either partially written at the time of request or has been completely written but the putInProgress flag is not yet set to 'false' (thereby indicating the completion of the creation of the large data object). Similar to the examples described in conjunction with the medium-sized data object, the object engine 216 may determine if the data content is complete. If the data content is complete, the same may be returned in response to the requesting client (e.g., the client device 206). If the content is determined to be not complete, the object engine 216 may either generate an error or may return an earlier version of the large data object (and its corresponding data), if the same are available.

In an example, the object engine 216 may also enable writing of the data content of the large data object in multiple parts. In an example, the object engine 216 in response to receiving a client request from the client device 206, may write a first part of the data content of large data object to the distributed file system 204. At this stage, the object engine 216 may set the putInProgress flag to 'true' to indicate that the large data object is in the process of being written. Thereafter, additional requests to the object engine 216 or any other object engine (implemented in any other object gateway) may cause each subsequent write to update portions of the large data object previously created. In this manner, subsequent parts may be written to the distributed file system 204.

In an example, some of the parts may be written through other instances of the object engine 216. In another example, the parts may be written in any order. Each part may be identifiable as corresponding to the large data object based on the unique identifier of the large data object. As an example, when all the parts of the data content of the large object have been written, the client device 206 may send a request to the object engine 216 to finalize the creation or replacement of the data object by setting the putInProgress flag to 'false'. In another example, the object engine 216 may detect that all parts of the object have been written and may finalize the creation or replacement of the object by setting the putInProgress flag to 'false' upon the completion of the writing of the final part. As may be understood, the putInProgress flag may be used for achieving atomicity when writing large data object in multiple parts, as described previously in the context of the data objects of different sizes. Furthermore, enabling data writes through multiple object gateways (such as the object gateway 202) results in higher throughput, particularly in the context of large data objects, but may still present atomic creation or replacement semantics to clients.

The object location table 222 as described may also be used for ensuring atomicity when creating snapshots. A snapshot may be considered as a read-only logical image of a volume at any specific point in time. As described previously, multiple data containers (e.g., the data containers 226) within the distributed file system 204 may be combined together to form a structure referred to as a volume. In an example of the present subject matter, a subset of data containers within the data containers 226 within the distributed file system 204 may be designated for storing object location table 222. In such instances, the object location table 222 may be stored in the designated containers and may contain references to the data containers 226. The volume may have one or more name containers that in turn reference the designated containers. In the context of distributed file systems, name containers hold a volume's namespace information along with information pertaining to locations of data chunks.

In an example, while creating snapshots, updates to the distributed file system 204 may be suspended. Once the updates to the distributed file system 204 are suspended, a snapshot of the name containers, which include references to the designated containers, a volume's namespace information, etc., may be obtained. Subsequently, a snapshot of the designated containers which hold the metadata (e.g., in the form of object location table 222) may be captured. Thereafter, a snapshot of the data containers 226 (which may be referenced by the object location table 222 present in the designated container) may be obtained. Considering that the each of the different types of containers reference each other, obtaining snapshots of the name containers, the designated containers, and the data containers 226 provides referential integrity between the name containers and the data containers 226.

In another example, the name containers, designated data containers and data containers 226 may be implemented in a way such that blocks are not overwritten, but new versions are written instead to free blocks, with the previous versions being freed at any later time instant. In an example, writing of new version of the data content may be implemented using a scheme known as redirect on write, wherein which copy on write, or deletion of previous versions of blocks may be suspended. In an example, instead of pausing updates throughout the volume, the distributed file system 204 may simply pause deallocations on the name container. Since all references go from the name container to data containers, pause deallocations on the name container has the effect of pausing deallocations on all of the data containers, at the same time. The same ordering of references mentioned to in the previous example will still apply and thus referential integrity will be preserved during the snapshot. Importantly, the snapshot will appear to have occurred atomically at the moment in time that the snapshot of the primary name container was initially obtained.

Figure 8:
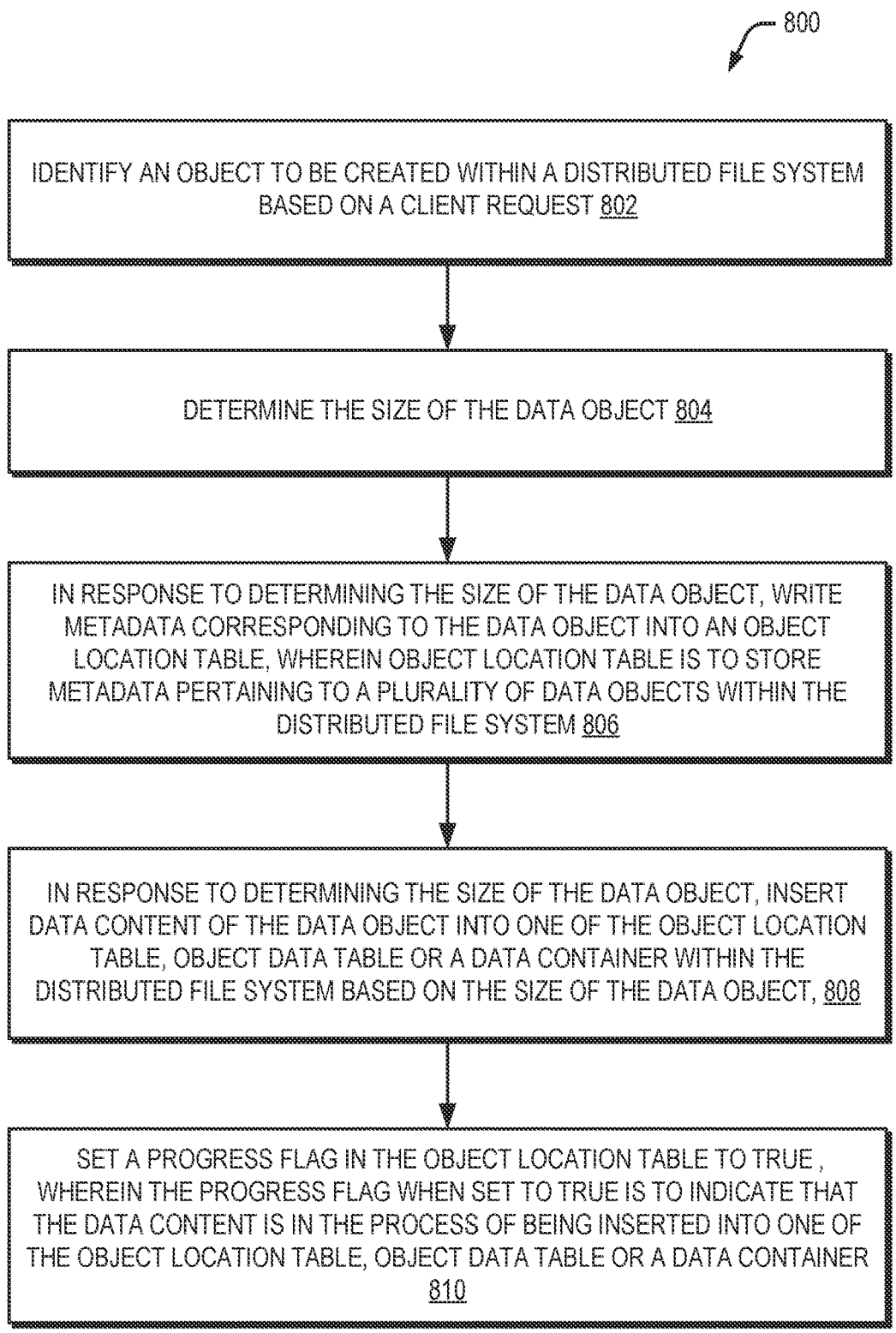
FIG. 8 illustrates a method for creating and writing data objects in a distributed file system, as per an example.

FIG. 8 illustrates an example method 800 for creating and writing data objects in a distributed file system, in accordance with examples of the present subject matter. The order in which the above-mentioned methods are described is not intended to be construed as a limitation, and some of the described method blocks may be combined in a different order to implement the methods, or alternative methods.

Furthermore, the above-mentioned methods may be implemented as hardware or a combination of hardware and programming. The steps of such methods may be performed by either a processor-based system under the instruction of machine executable instructions stored on a non-transitory computer readable medium or by dedicated hardware circuits, microcontrollers, or logic circuits. For example, the methods may be performed by a computing device, which may include the object gateway 202. In an example, the gateway 202 may be coupled to a distributed file system 204.

At block 802, an object to be created within a distributed file system may be identified based on a client request. For example, the object gateway 202 may initially receive a client request from the client device 206. The client request may be a request to create a data object within the distributed file system 204. In such systems, data objects, which besides including data, may also include metadata corresponding to such data. In addition, the data objects may include identification information or identifiers which may aid in uniquely identifying any given data object.

At block 804, the size of the object may be determined. For example, the object engine 216 may determine the size of the data object that is to be created in response to the client request received from the client device 206. In an example, the object engine 216 may use a first threshold, a second threshold, and a third threshold to determine whether the data object under consideration is a tiny data object, a small data object, a medium-sized object, or a large data object. Depending on the size of the data object, the object engine 216 may determine the manner in which the data object is to be stored in the distributed file system 204.

At block 806, in response to determining the size of the object, metadata corresponding to the object may be written into an object location table. The object location table stores metadata pertaining to data objects within the distributed file system. For example, the object engine 216 may write the metadata that to the object location table, such as the object location table 222. The object location table 222 may include a number of fields to which the metadata of the data object under consideration may be written. Examples of such fields include, fields 302 of the object location table 222, which in turn include obj_loc field 302-1, obj_metadata field 302-2, sys metadata field 302-3, putInProgress field 302-4, dataInDB field 302-5, ETag field 302-6, access control field 302-7, Tags field 302-8, and obj_data field 302-9.

At block 808, data content corresponding to the object may be inserted into either the object location table, object data table, or a data container within the distributed file system, depending on the size of the data object. For example, depending on the size of the data objects under consideration, the object engine 216 may determine how the data object (depending on whether it is a tiny data object, small data object, medium-sized data object, or a large data object) is to be stored. For tiny data object, the object engine 216 may cause the data content of the tiny data object to be written directly to the object location table 222. In an example, the tiny data object may be written to the obj_data field (e.g., obj_data field 302-9) within the object location table 222. In case the data object was determined to be a small data object, its data content may be written to the object data table 224. In such a case, the object location table may store a reference to the object location table 222 storing the data content of the small data object.

The medium-sized data objects and the large data objects are neither written to the object location table 222 nor the object data table 224 but stored as one or more storage units or data chunks within one or more data containers (e.g., data containers 226) in the distributed file system 204. In this case, the location of the data content corresponding to the third data object may be referenced in one of the fields of the object location table 222. In an implementation, the medium-sized data object may be written as a single chunk, and the large data object may be written as a plurality of chunks within the data containers 226.

At block 810, a progress flag in the object location table may be set to 'true' to indicate that the data content is in the process of being inserted into one of the object location table, the object data table, or a data container within the distributed file system. In an example, the object engine 216 may also set the putInProgress flag to either 'true' or 'false'. The putInProgress flag set as 'true' indicates that the writing of the data object is in progress. On the other hand, the putInProgress flag when set as 'false' indicates that the data corresponding to the data object has been completely written.

Figure 9:
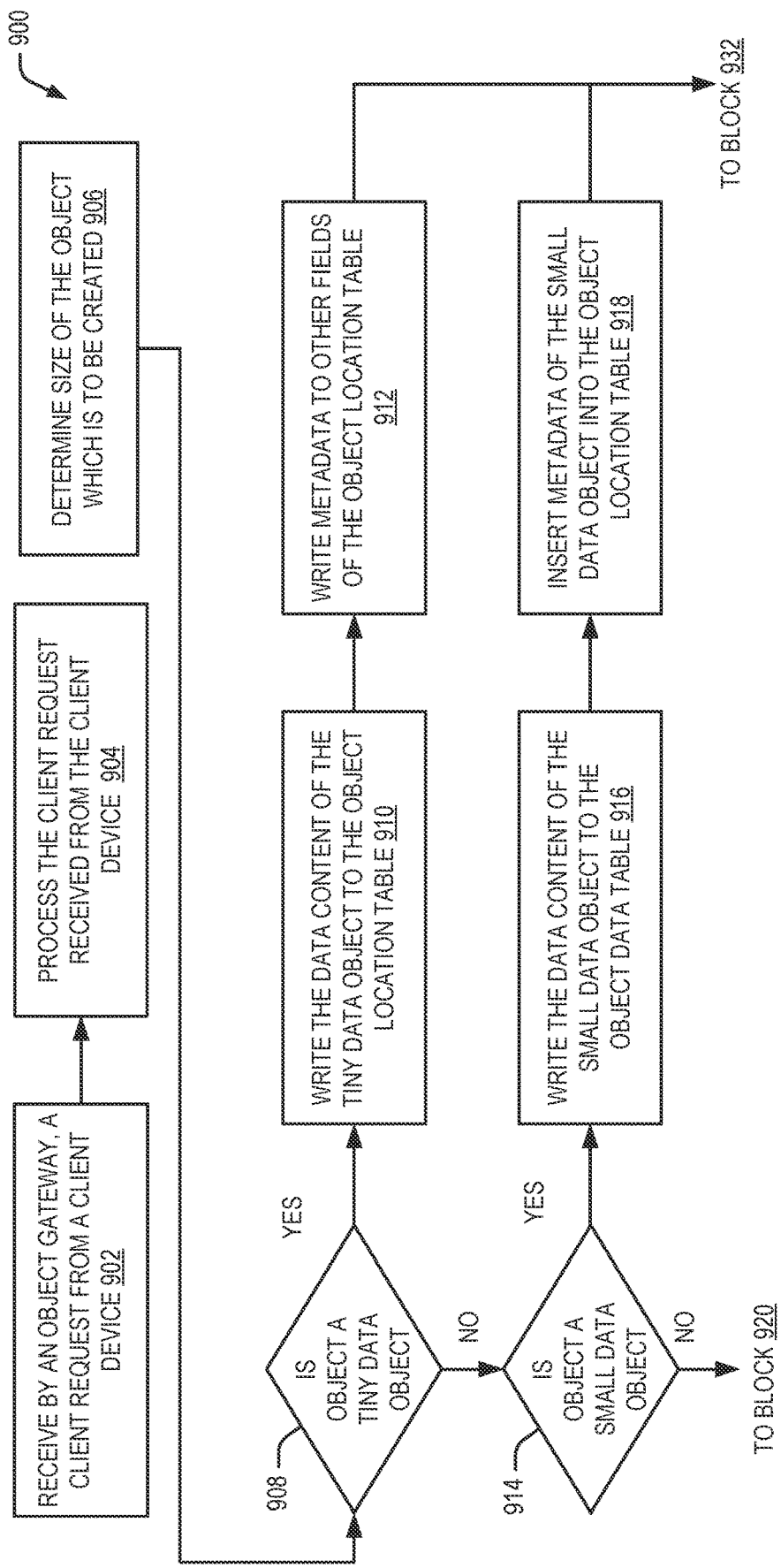
FIGS. 9-10 collectively illustrate a method for creating and writing data objects of different sizes in a distributed file system, as per another example.
Figure 10:
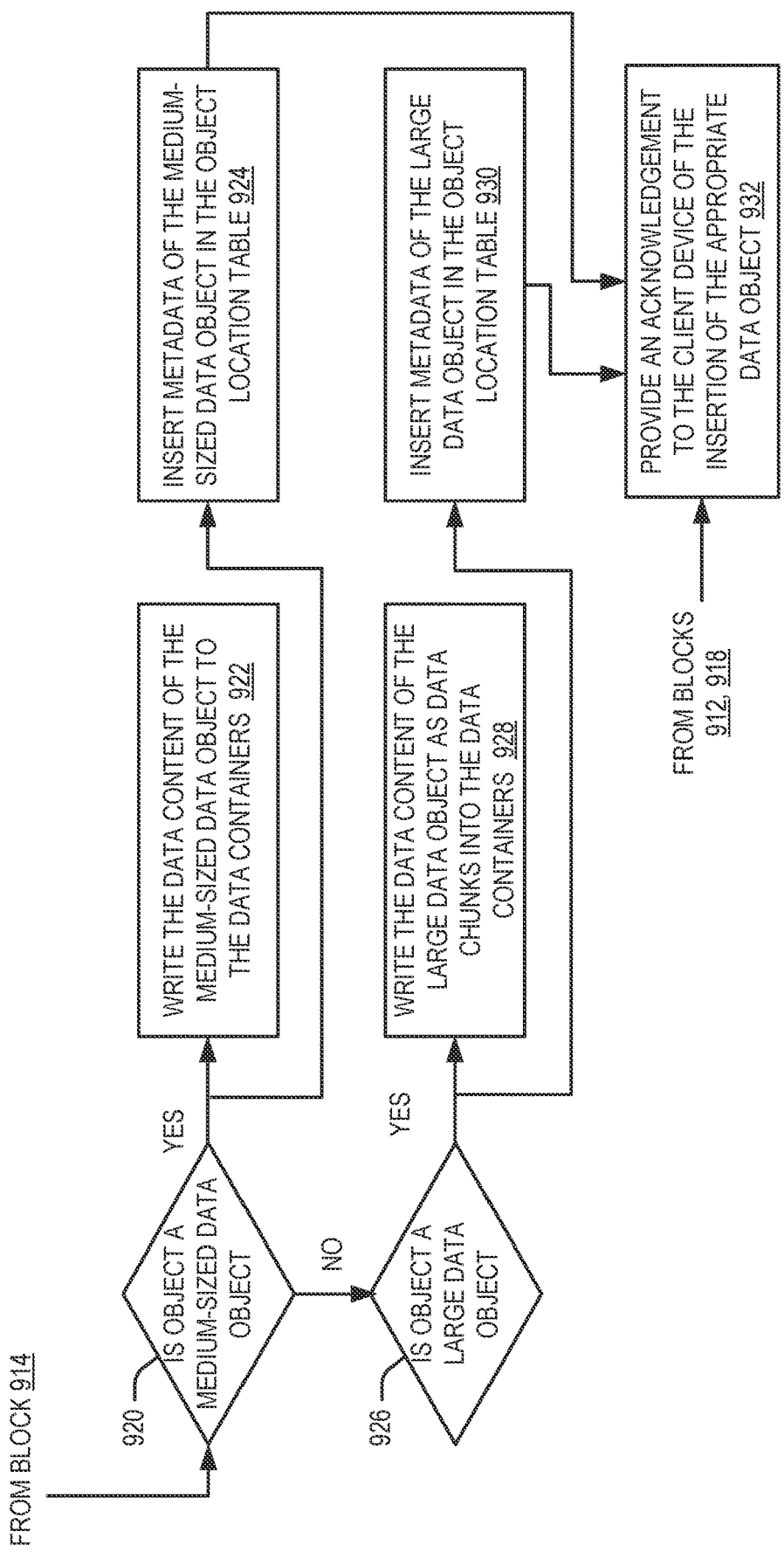

FIGS. 9-10 illustrate an example method 900 for creating and writing data objects in a distributed file system, in accordance with examples of the present subject matter. The order in which the above-mentioned methods are described is not intended to be construed as a limitation, and some of the described method blocks may be combined in a different order to implement the methods, or alternative methods. The method 900 is further described in the context of a cluster computing environment 200, which includes the object gateway 202, which may be coupled to a distributed file system 204. As described previously, the environment may include additional object gateways in communication with other client device in other examples.

At block 902, a client request from a client device may be received by an object gateway. For example, the object gateway 202 may initially receive a client request from the client device 206. The client request may be a request to create a data object within the distributed file system 204. Data objects may include data content and metadata. In an example, the metadata may include identification information or identifiers of the data object.

At block 904, the client request received from the client device may be processed. For example, upon receiving the client request from the client device 206, the object engine 216 may process the client request. In an example, the client request may specify an object identifier. The client request may be processed to identify an object that is to be created within the distributed file system 204, based on the object identifier. In an example, the client device 206 may follow an object protocol for communicating the client request to the gateway 202.

At block 906, size of the object which is to be created, may be determined. For example, the object engine 216 may determine the size of the data object to be created based the client request received from the client device 206. In an example, the object engine 216 may determine the data object to be either a tiny data object, a small data object, a medium-sized data object, or a large data object based on comparing the size of the data content to the values of the first threshold, the second threshold, and the third threshold, respectively. Depending on the size of the data object, the object engine 216 may determine the manner in which the data objects may be stored onto the distributed file system 204, as explained further.

At block 908, it may be determined whether the data object under consideration is a tiny data object. For example, the object engine 216 may check whether the data object to be created is a tiny data object, if the size of the data object is less than the first threshold. In an example, the first threshold may be 100 bytes. If the object engine 216 determines that a tiny data object is to be created ('Yes' path from block 908), the object engine 216 may cause the data content corresponding to the tiny data object to be written to a row of the object location table 222, as a single row update (block 910). In an example, the data content and the metadata of the tiny data object may be written to one of the fields (e.g., the obj_data field) within the object location table 222. The method may proceed further with the metadata being written to other fields, obj_metadata field, sys metadata field, putInProgress field, dataInDB field, ETag field, access control field, and Tags field (block 912) of the object location table 222.

If the data object to be created is not a tiny data object ('No' path from block 908), the object engine 216 may check whether the data object to be created is a small data object (block 914) by comparing the size of the data object with the first threshold and the second threshold. A data object may be considered a small data object if its size is greater than or equal to the first threshold and less than the second threshold. In an example, the second threshold may be 16 kilobytes. If the object engine 216 determines that the small data object is to be created ('Yes' path from block 914), the object engine 216 may write the data content of the small data object into the object data table 224 (block 916).

The method may proceed further, wherein at block 918, the object engine 216 may further insert the metadata of the small data object into the object location table 222. In an example, the object engine 216 may set the dataInDB field, such as the dataInDB field 302-5, to '1' indicating that the small data object is present in the object data table 224. In another example, the object engine 216 may further cause a putInProgress flag in the putInProgress field 302-4 to be set to 'true' to indicate that the transfer of the small data object has commenced and is in progress. In yet another example, the object location table 222 may store a reference to the object data table 224 storing the data content of the small data object.

If the data object to be created is not a small data object ('No' path from block 914), the method may proceed further with the object engine 216 checking whether the data object to be created is a medium-sized data object (block 920, with the method continuing through FIG. 10). For example, the object engine 216 may determine a given data object to be a medium-sized data object, if the size of the medium-sized data object is greater than or equal to the second threshold and is less than a third threshold. In an example, the third threshold is 256 MB. If the object engine 216 determines that the medium-sized data object is to be created ('Yes' path from block 920), the object engine 216 may write the data content of the medium-sized data object to the data containers 226 within the distributed file system 204 in the form of a data chunk (block 922).

The method may further proceed to block 924 from block 920, wherein which the object engine 216 may concurrently insert metadata of the medium-sized data object, into the object location table 222. In an example, the object engine 216 may set the putInProgress flag (e.g., the putInProgress field 302-4) within the object location table 222 to 'true' while the medium-sized data object is being written to the data containers 226. In an example, once the medium-sized data object has been written to data containers 226, the object engine 216 may ascertain whether the file contents have been written and may be checked for completeness.

If the data object to be created is not a medium-sized data object ('No' path from block 920), the method may proceed with the object engine 216 checking whether the data object is a large data object (block 926). For example, the object engine 216 may consider a given data object as a large data object, if the size of the large data object is greater than or equal to the third threshold. If the object engine 216 determines that the large data object is to be created ('Yes' path from block 926), the object engine 216 may thereafter insert the data content of the large data object as plurality of data chunks into the distributed file system 204 (block 928). In an example, the object engine 216 may concurrently insert metadata of the large data object into the object location table 222 (block 930).

In an example, the object engine 216 may set the putInProgress flag (e.g., the putInProgress field 302-4) within the object location table 222 to 'true' while the large data object is being written to the data containers 226. In another example, the object location table 222 may maintain a reference to a table of pointers, with the pointers pointing to the multiple chunks of the large data object. While the data chunks are written, the object engine 216 may update the table of pointers using an update command.

Once the data objects of the different sizes have been written or created (e.g., from blocks 912, 918, 924, and 930), the method may proceed to block 932. At block 932, an acknowledgment may be provided to the client device in response to the data content of the data object being written to either the object location table, object data table, or the data containers within the distributed file system. For example, the object engine 216, on determining that the data object has been written to the object location table 222, object data table 224, or the data containers 226 (depending on the size of the data objects), may provide an acknowledgment to the client device 206. In an example, once the acknowledgment has been provided to the client device 206, the object engine 216 may further set the putInProgress flag to 'false' indicating that the data object (e.g., the tiny data object, the small data object, the medium-sized data object, or the large data object) has been written.

Figure 11:
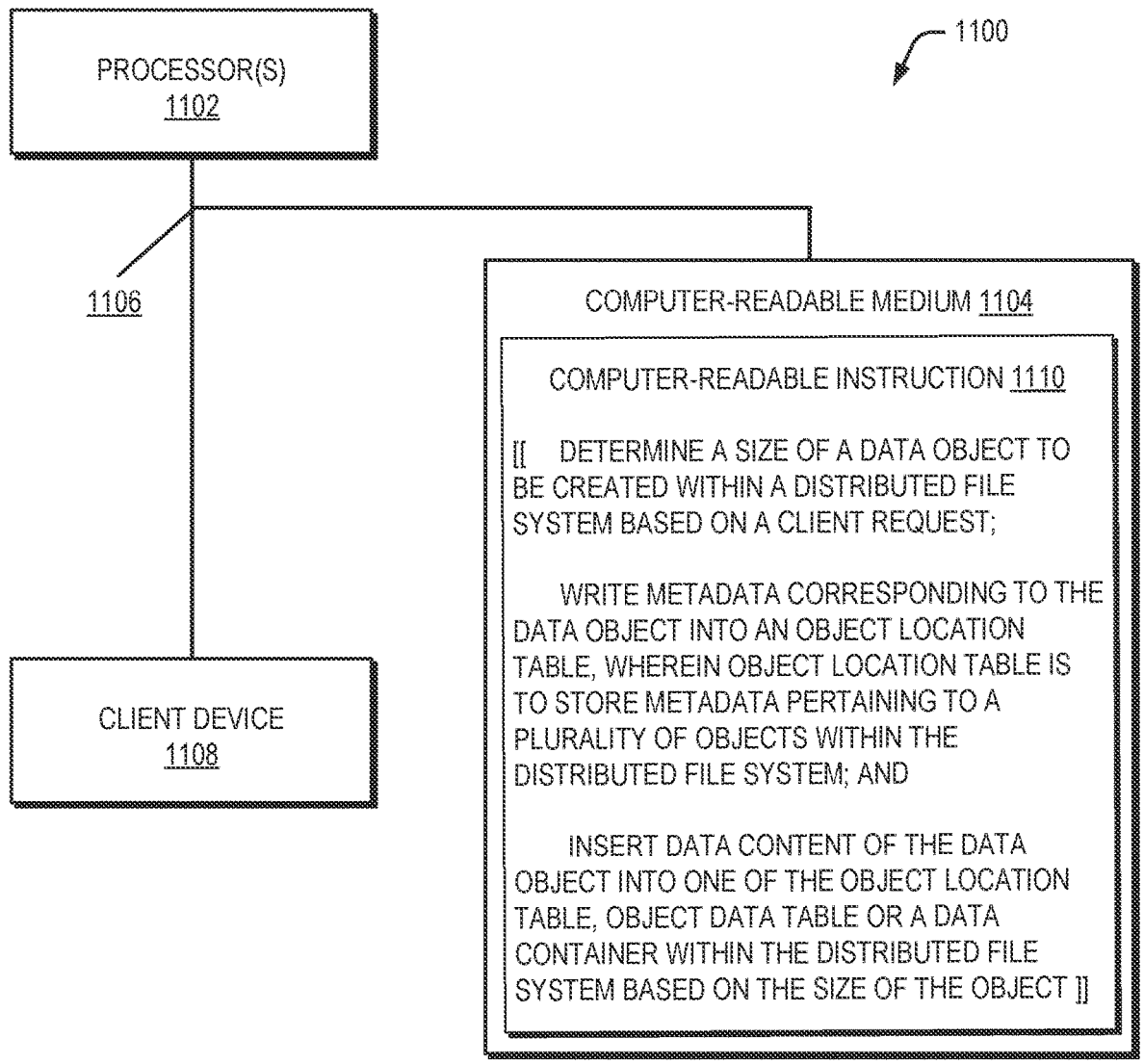
FIG. 11 illustrates a system environment implementing a non-transitory computer readable medium for creating and writing data objects of different sizes in a distributed file system, as per an example.

FIG. 11 illustrates a computing environment 1100 implementing a non-transitory computer readable medium for managing data objects of different sizes within a distributed file system, as per an example. In an example, the computing environment 1100 includes processor(s) 1102 communicatively coupled to a non-transitory computer readable medium 1104 through a communication link 1106. In an example implementation, the computing environment 1100 may be or serve as, for example, the system 102 or the object gateway 202. In an example, the processor(s) 1102 may have a single processing resource or multiple processing resources for fetching and executing computer-readable instructions from the non-transitory computer readable medium 1104. The processor(s) 1102 and the non-transitory computer readable medium 1104 may be implemented, for example, in system 102 or the object gateway 202 (as has been described in conjunction with the preceding figures).

The processor(s) 1102 may include a microcontroller, a microprocessor, a CPU, an ASIC, an FPGA, an SOC, and/or other hardware device suitable for retrieval and/or execution of instructions from the non-transitory computer readable medium 1104 to perform functions related to various examples. Additionally, or alternatively, the processor(s) may include or be coupled to electronic circuitry or dedicated logic for performing some or all of the functionality of the instructions described herein.

The non-transitory computer readable medium 1104 may be, for example, an internal memory device or an external memory device, such as RAM, ROM, EEPROM, flash memory, a hard disk drive, an optical disc, or the like. The computer readable medium 1104 may be disposed within a computer system, in which case the executable instructions may be deemed installed or embedded on the computer system. Alternatively, the computer readable medium 1104 may be a portable (e.g., external) storage medium, and may be part of an installation package.

In an example implementation, the communication link 1106 may be a network communication link. The processor(s) 1102 and the non-transitory computer readable medium 1104 may also be communicatively coupled to a computing device 1108 over the network.

In an example implementation, the non-transitory computer readable medium 1104 includes a set of computer readable instructions 1110 (referred to as instructions 1110) which may be accessed by the processor(s) 1102 through the communication link 1106. The computer readable instructions 1100 may be useful for implementing the object engine 216 that interacts with the distributed file system 204. Referring to FIG. 11, in an example, the non-transitory computer readable medium 1104 includes instructions 1110 that when executed may determine a size of a data object to be created within a distributed file system, in response to a client request. For example, the instructions 1110 may cause the object engine 216 to determine the size of a data object, in response to a client request received from a client device 206. Thereafter, the instructions 1110 may be executed to cause metadata of the data object to be written to an object location table of a distributed file system. In an example, the object location table (e.g., the object location table 222) may store metadata corresponding to multiple data objects within the distributed file system 204.

With the metadata being written to the object location table 222, the instructions 1110 may cause data content of the data object to be written to either the object location table, an object data table, or to data containers within the distributed file system. For example, the instructions 1110 may cause data content of tiny data objects (i.e., data objects having size less than 100 bytes) to be written to the object location table (e.g., the object location table 222). In another example, the small data objects (i.e., data objects having size greater than or equal to 100 bytes and less than 16 kilobytes) may be written to the object data table (e.g., the object data table 224). The medium-sized data objects and the large data objects (i.e., data objects having size more than 16 kilobytes) on the other hand may be written to data containers 226 within the distributed file system 204 as a data chunk or plurality of chunks, respectively.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

The invention claimed is:

1. A system comprising:
a processor; and
a non-transitory machine-readable storage medium comprising instructions executable on the processor to:
  determine, in response to a receiving a client request, that a size of a first data object to be created, including first data content, is less than a first size threshold;
  based on determining that the size of the first data object including the first data content is less than the first size threshold, insert the first data content of the first data object together with metadata of the first data object into an object location table, wherein the object location table stores metadata pertaining to a plurality of data objects within a distributed file system;
  determine a second data object to be created within the distributed file system, wherein the second data object, including second data content, is of a size greater than or equal to the first size threshold;
  write metadata of the second data object into the object location table; and
  insert the second data content of the second data object into an object data table, wherein the metadata of the second data object written into the object location table comprises a reference to the object data table.

2. The system of claim 1, wherein the instructions are executable on the processor to further:
set an in-progress flag in the object location table to true while inserting the second data content of the second data object into the object data table.

3. The system of claim 1, wherein the object location table comprises a data presence flag indicating whether the first data content of the first data object is inserted into the object location table.

4. The system of claim 1, wherein the size of the second data object is less than a second size threshold, and the instructions are executable on the processor to:
determine a third data object to be created within the distributed file system, wherein the third data object, including third data content, is of a size greater than or equal to the second size threshold and less than a third size threshold;
write metadata of the third data object into the object location table; and
insert the third data content of the third data object into a data container within the distributed file system.

5. The system of claim 4, wherein the object location table comprises a record containing:
an object location field that points to a location of the third data content stored in the data container within the distributed file system, and
a metadata field containing the metadata of the third data object.

6. The system of claim 4, wherein the instructions are executable on the processor to:
determine a fourth data object to be created within the distributed file system, wherein the fourth data object, including fourth data content, is of a size greater than or equal to the third size threshold;
write metadata of the fourth data object into the object location table;
insert the fourth data content of the fourth data object as a plurality of data chunks into a further data container within the distributed file system; and
update the object location table with a reference to a table of pointers that reference the plurality of data chunks corresponding to the fourth data object.

7. The system of claim 6, wherein to update the object location table, the instructions are executable on the processor to update a pointer of the pointers concurrently with inserting a corresponding data chunk of the plurality of data chunks into the further data container.

8. A system comprising:
a processor; and
a non-transitory machine-readable storage medium comprising instructions executable on the processor to:
  determine, in response to a receiving a client request, that a size of a first data object to be created, including data content, is less than a first size threshold;
  based on determining that the size of the first data object including the data content is less than the first size threshold, insert the data content of the first data object together with metadata of the first data object into an object location table, wherein the object location table stores metadata pertaining to a plurality of data objects within a distributed file system; and
  for respective data objects of the plurality of data objects that are of sizes greater than the first size threshold, store the data content of the respective data objects outside of the object location table,
wherein the object location table is stored in a main memory of a computing device of the distributed file system, and the object location table comprises a plurality of records containing the metadata of respective data objects of the plurality of data objects, and wherein the metadata of the first data object is inserted into a first field of a first record of the plurality of records, and the data content of the first data object is inserted into a second field of the first record.

9. The system of claim 8, wherein the inserting of the data content together with the metadata of the first data object into the object location table comprises:
performing a single row update that writes the metadata of the first data object to a metadata field of a row of the object location table, and inserts the data content of the first data object into an object data field of the row.

10. A method comprising:
identifying, by a system comprising a hardware processor, a first data object and a second data object to be created within a distributed file system, the first data object including first data content, and the second data object including second data content;

determining, by the system, a first size of the first data object and a second size of the second data object, the second size greater than the first size; and based on determining the first size of the first data object and the second size of the second data object:

writing, by the system, metadata of the first data object into a first row of an object location table, and inserting the first data content of the first data object into the first row of the object location table, and writing, by the system, metadata of the second data object into a second row of the object location table, and inserting the second data content of the second data object into a storage location outside the object location table.

11. The method of claim 10, wherein the storage location outside the object location table comprises an object data table or a data container within the distributed file system, the method further comprising:

responsive to a completion of the inserting of the second data content into the object data table or the data container, setting an in-progress flag to indicate that writing of the second data content has completed.

12. The method of claim 11, comprising:

detecting a client request seeking to access the second data content; and returning the second data content based on a state of the in-progress flag.

13. The method of claim 11, wherein the in-progress flag is set to a first state to indicate that the writing of the second data content has completed, and to a different second state to indicate that the writing of the second data content is in progress.

14. The method of claim 10, wherein the first row comprises a metadata field and an object data field, the method comprising:

performing a single row update that writes the metadata of the first data object to the metadata field of the first row, and inserts the first data content of the first data object into the object data field of the first row.

15. The method of claim 10, wherein:

the inserting of the first data content of the first data object into the first row of the object location table is based on the first size of the first data object being less than a first size threshold, and the inserting of the second data content of the second data object into the storage location outside the object location table is based on the second size of the second data object being greater than the first size threshold.

16. The method of claim 15, wherein the storage location comprises an object data table, and the second data content is inserted into the object data table based on the second size of the second data object being greater than or equal the first size threshold and less than a second size threshold, the method further comprising:

determining, by the system, that a third size of a third data object including third data content is greater than or equal to the second size threshold and less than a third size threshold; and based on determining that the third size of the third data object is greater than or equal the second size threshold and less than the third size threshold, inserting, by the system, the third data content of the third data object into a data container within the distributed file system, and updating an object location field in a third row of the object location table with a reference to the data container.

17. The method of claim 10, further comprising:

receiving, by the system, a request to access the first data object; and returning, by the system, the first data content from the first row of the object location table as a response to the request.

18. A non-transitory computer-readable medium comprising instructions that, when executed on a processor, cause a system to:

determine a size of a data object, including data content, to be created within a distributed file system based on a client request; and based on the size of the data object being less than a first size threshold:

perform a single row update in an object location table by writing metadata of the data object into a row of the object location table, and inserting the data content of the data object into the row of the object location table, wherein the object location table is to store metadata pertaining to a plurality of data objects within the distributed file system.

19. The non-transitory computer-readable medium of claim 18, wherein the instructions when executed on the processor cause the system to:

determine a size of a second data object, including second data content, to be created within the distributed file system; and based on the size of the second data object being greater than or equal the first size threshold and less than a second size threshold:

write metadata of the second data object into a second row of the object location table, insert the second data content into a storage location outside the object location table, and set an in-progress flag in the second row of the object location table to indicate that the second data content is in process of being inserted into the storage location outside the object location table.

20. The non-transitory computer-readable medium of claim 19, wherein the storage location outside the object location table comprises an object data table, and the instructions when executed on the processor cause the system to:

determine a size of a third data object, including third data content, to be created within the distributed file system; and based on the size of the third data object being greater than or equal the second size threshold and less than a third size threshold:

write metadata of the third data object into a third row of the object location table, and insert the third data content of the third data object into a data container within the distributed file system.

* * * * *